United States Patent
Spektor et al.

(10) Patent No.: US 11,132,457 B2
(45) Date of Patent: Sep. 28, 2021

(54) EDITING USING SECURE TEMPORARY SESSION-BASED PERMISSION MODEL IN A FILE STORAGE SYSTEM

(71) Applicant: Microsoft Technology Licensing, LLC, Redmond, WA (US)

(72) Inventors: Daron Spektor, Seattle, WA (US); Jyotsana Rathore, Kirkland, WA (US); Jose A. Barreto, Redmond, WA (US); Kevin Andrew Chan, Redmond, WA (US); Peter Daniel Henderson, Bellevue, WA (US); Gabriela Kornelia Kaczka, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 16/428,830

(22) Filed: May 31, 2019

(65) Prior Publication Data

US 2020/0304487 A1 Sep. 24, 2020

Related U.S. Application Data

(60) Provisional application No. 62/821,826, filed on Mar. 21, 2019, provisional application No. 62/821,781, (Continued)

(51) Int. Cl.
*G06F 21/00* (2013.01)
*G06F 21/62* (2013.01)
(Continued)

(52) U.S. Cl.
CPC ........ *G06F 21/6218* (2013.01); *G06F 16/134* (2019.01); *G06F 16/183* (2019.01);
(Continued)

(58) Field of Classification Search
CPC ... G06F 21/6218; H04L 63/08; H04L 63/083; H04L 63/0853; H04L 63/101; H04L 63/108
(Continued)

(56) References Cited

U.S. PATENT DOCUMENTS 5,960,194 A 9/1999 Choy et al.
6,356,941 B1 3/2002 Cohen
(Continued)

FOREIGN PATENT DOCUMENTS

EP 2803010 A1 11/2014

OTHER PUBLICATIONS

"Class AWSEC2IAMSessionCredentials", Retrieved from: https://jets3t.s3.amazonaws.com/api/org/jets3t/service/security/AWSEC2IAMSessionCredentials.html, Retrieved Date: Apr. 18, 2019, 05 Pages.
(Continued)

*Primary Examiner* — Longbit Chai
(74) *Attorney, Agent, or Firm* — Newport IP, LLC; Han Gim

(57) ABSTRACT

A system is provided for controlling access to data stored in a cloud-based storage service. Data associated with a user account is stored at the cloud-based storage service. A portion of the data is associated with a heightened authentication protocol, a first request receiving, at the cloud-based storage service, for an application to access data that is associated with the heightened authentication protocol. The first request is authenticated based on the heightened authentication protocol. In response to authenticating the first request, permission is granted to the application to access the data that is associated with the heightened authentication protocol. The permission is time-limited. It is determined that the application is editing the data that is associated with
(Continued)

the heightened authentication protocol. Permission for the application to access the data while the application is editing the data is temporarily extended.

20 Claims, 11 Drawing Sheets

Related U.S. Application Data filed on Mar. 21, 2019, provisional application No. 62/821,739, filed on Mar. 21, 2019, provisional application No. 62/821,703, filed on Mar. 21, 2019.

(51) Int. Cl.
    *H04L 29/06* (2006.01)
    *G06F 16/182* (2019.01)
    *G06F 16/13* (2019.01)
    *H04L 29/08* (2006.01)

(52) U.S. Cl.
    CPC ............ *H04L 63/08* (2013.01); *H04L 63/083* (2013.01); *H04L 63/0853* (2013.01); *H04L 63/101* (2013.01); *H04L 63/105* (2013.01); *H04L 63/108* (2013.01); *H04L 63/20* (2013.01); *H04L 67/306* (2013.01); *H04L 2463/082* (2013.01)

(58) Field of Classification Search
    USPC .......................................................... 726/5
    See application file for complete search history.

(56) References Cited

U.S. PATENT DOCUMENTS

| | | |
|---|---|---|
| 6,446,225 B1 | 9/2002 | Robsman et al. |
| 6,691,232 B1 | 2/2004 | Wood et al. |
| 6,892,307 B1 | 5/2005 | Wood et al. |
| 7,334,017 B2 | 2/2008 | Hawkes et al. |
| 7,865,449 B2 | 1/2011 | Tattan et al. |
| 7,937,458 B2 | 5/2011 | Nanamura et al. |
| 7,984,500 B1 | 7/2011 | Khanna et al. |
| 8,024,211 B1 | 9/2011 | Cohen |
| 8,024,661 B2 | 9/2011 | Bibliowicz et al. |
| 8,572,391 B2 | 10/2013 | Golan et al. |
| 8,601,557 B2 | 12/2013 | Slaton et al. |
| 8,631,486 B1 | 1/2014 | Friedman et al. |
| 8,788,819 B2 | 7/2014 | Broder et al. |
| 8,935,756 B2 | 1/2015 | Islam et al. |
| 9,047,480 B2 | 6/2015 | Kahol et al. |
| 9,069,976 B2 | 6/2015 | Toole et al. |
| 9,237,141 B2 | 1/2016 | Logue et al. |
| 9,251,114 B1 | 2/2016 | Ancin et al. |
| 9,444,824 B1 | 9/2016 | Balazs et al. |
| 9,525,685 B2 | 12/2016 | Grigg et al. |
| 9,674,201 B1 | 6/2017 | Margel et al. |
| 9,697,061 B1 | 7/2017 | Lazier |
| 9,876,859 B1 | 1/2018 | Plummer et al. |
| 9,942,244 B2 | 4/2018 | Lahoz et al. |
| 10,104,129 B1 | 10/2018 | Fischer et al. |
| 10,200,359 B1 | 2/2019 | Sokolov et al. |
| 10,268,449 B1 | 4/2019 | Wang et al. |
| 10,333,707 B1 | 6/2019 | Pathak et al. |
| 10,650,121 B1 | 5/2020 | Wei et al. |
| 10,860,604 B1 | 12/2020 | Pandey et al. |
| 2006/0023751 A1 | 2/2006 | Wilson et al. |
| 2006/0156389 A1 | 7/2006 | Brown et al. |
| 2007/0250920 A1 | 10/2007 | Lindsay |
| 2007/0299887 A1 | 12/2007 | Novik |
| 2008/0002911 A1 | 1/2008 | Eisen et al. |
| 2008/0060061 A1 | 3/2008 | Deshpande et al. |
| 2010/0011036 A1 | 1/2010 | Wagner |
| 2010/0169393 A1 | 7/2010 | Fruchter et al. |
| 2010/0299763 A1 | 11/2010 | Marcus et al. |
| 2011/0184998 A1 | 7/2011 | Palahnuk et al. |
| 2012/0311027 A1 | 12/2012 | Salusky et al. |
| 2013/0036370 A1 | 2/2013 | Ananthakrishnan |
| 2013/0238908 A1 | 9/2013 | Pizano |
| 2014/0019555 A1 | 1/2014 | Cai et al. |
| 2014/0289831 A1 | 9/2014 | Prakash et al. |
| 2015/0120924 A1 | 4/2015 | Scott et al. |
| 2015/0317630 A1 | 11/2015 | Piel et al. |
| 2015/0370827 A1 | 12/2015 | Parkison et al. |
| 2016/0173623 A1 | 6/2016 | Broussard et al. |
| 2016/0212132 A1 | 7/2016 | Banerjee |
| 2016/0261707 A1 | 9/2016 | Rajagopalan et al. |
| 2016/0300079 A1 | 10/2016 | Gong |
| 2017/0041296 A1 | 2/2017 | Ford et al. |
| 2017/0078168 A1 | 3/2017 | Harris et al. |
| 2017/0104756 A1 | 4/2017 | Rosenthal et al. |
| 2017/0126854 A1 | 5/2017 | Mosko |
| 2017/0149737 A1 | 5/2017 | Betzler et al. |
| 2017/0235490 A1* | 8/2017 | Tan ..................... G06F 21/6218 711/152 |
| 2017/0324742 A1 | 11/2017 | Gopalakrishnan |
| 2018/0052836 A1 | 2/2018 | Nicholls |
| 2018/0060350 A1 | 3/2018 | Christiansen et al. |
| 2018/0063115 A1 | 3/2018 | Miller |
| 2018/0084074 A1 | 3/2018 | Juneja et al. |
| 2018/0173731 A1 | 6/2018 | Nazari et al. |
| 2018/0196954 A1 | 7/2018 | Erickson et al. |
| 2018/0262480 A1 | 9/2018 | Doi et al. |
| 2018/0262864 A1 | 9/2018 | Reynolds et al. |
| 2018/0285591 A1 | 10/2018 | Thayer et al. |
| 2018/0329905 A1 | 11/2018 | Christiansen et al. |
| 2018/0352005 A1 | 12/2018 | Gaddam et al. |
| 2019/0050600 A1 | 2/2019 | Sahoo et al. |
| 2019/0087835 A1 | 3/2019 | Schwed et al. |
| 2019/0141051 A1 | 5/2019 | Ikarashi |
| 2019/0236265 A1 | 8/2019 | Juyal et al. |
| 2019/0266502 A1 | 8/2019 | Moser et al. |
| 2019/0273746 A1 | 9/2019 | Coffing |
| 2020/0004962 A1 | 1/2020 | Araujo et al. |
| 2020/0074108 A1 | 3/2020 | Fox et al. |
| 2020/0097558 A1 | 3/2020 | Fanghaenel |
| 2020/0218795 A1 | 7/2020 | Antar et al. |
| 2020/0227164 A1 | 7/2020 | Bender et al. |
| 2020/0252377 A1 | 8/2020 | Vyncke et al. |
| 2020/0267282 A1 | 8/2020 | Tong |
| 2020/0302075 A1 | 9/2020 | Rathore et al. |
| 2020/0304511 A1 | 9/2020 | Rathore et al. |
| 2020/0304516 A1 | 9/2020 | Lazar et al. |
| 2020/0358822 A1 | 11/2020 | Erickson et al. |
| 2020/0401418 A1 | 12/2020 | Regev et al. |
| 2021/0029194 A1 | 1/2021 | Kurian et al. |
| 2021/0097005 A1 | 4/2021 | Craske |
| 2021/0112065 A1 | 4/2021 | Yang et al. |

OTHER PUBLICATIONS

"HiveMP—PUT _session", Retrieved from: https://hivemp.com/docs/temp-session/rest/v1/session/put/, Retrieved Date: Apr. 18, 2019, 05 Pages.

"Temporary sessions", Retrieved from: https://sessionbox.freshdesk.com/support/solutions/articles/22000177899-temporary-sessions, Mar. 5, 2017, 01 Page.

Li, Chastina, "Auto-refresh AWS Tokens Using IAM Role and boto3", Retrieved from: https://dev.to/li_chastina/auto-refresh-aws-tokens-using-iam-role-and-boto3-2cjf, Oct. 18, 2018, 07 Pages.

"International Search Report and Written Opinion Issued in PCT Application No. PCT/US2020/022501", dated Jun. 30, 2020, 13 Pages.

"International Search Report and Written Opinion Issued in PCT Application No. PCT/US2020/022503", dated Jul. 2, 2020, 15 Pages.

"International Search Report and Written Opinion Issued in PCT Application No. PCT/US20/022514", dated Jul. 2, 2020, 13 Pages.

"File, Folder, Items, and Custom Object Security", Retrieved from: https://knowledge.autodesk.com/support/vault-products/learn-explore/caas/CloudHelp/cloudhelp/2019/EN/Vault-Admin/files/GUID-07AB6615-AFDD-4C86-96DE-A3D334AF454B-htm.html, Aug. 2, 2018, 07 Pages.

(56) References Cited

OTHER PUBLICATIONS

"HTTP Client Hints", In Internet Draft of HTTP Working Group, Internet Engineering Task Force, Jan. 26, 2018, 14 Pages.

Bretan, Matt, "How to Create a Policy That Whitelists Access to Sensitive Amazon S3 Buckets", Retrieved from: https://aws.amazon.com/blogs/security/how-to-create-a-policy-that-whitelists-access-to-sensitive-amazon-s3-buckets/, Sep. 14, 2015, 06 Pages.

"International Search Report and Written Opinion Issued in PCT Application No. PCT/US2020/022509", dated Jun. 30, 2020, 16 Pages.

Zhou, et al., "Hiding Data Accesses in Steganographic File System", In Proceedings of 20th International Conference on Data Engineering, Apr. 2, 2004, 12 Pages.

"Non Final Office Action Issued in U.S. Appl. No. 16/428,874", dated May 7, 2021, 37 Pages.

"Non Final Office Action Issued in U.S. Appl. No. 16/428,801", dated Jul. 20, 2021, 10 Pages.

"Non Final Office Action Issued in U.S. Appl. No. 16/428,824", dated Aug. 4, 2021, 12 Pages.

* cited by examiner

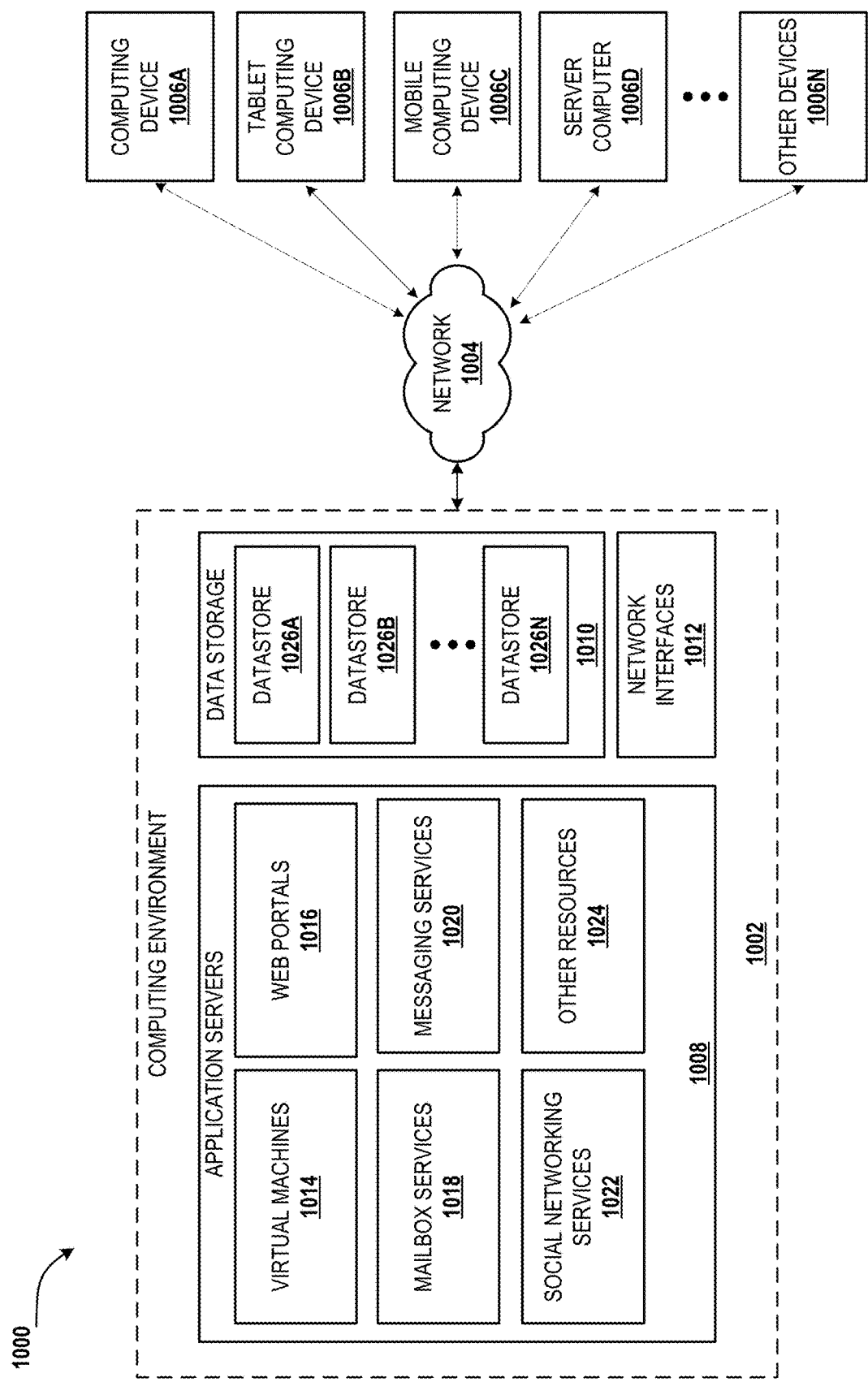

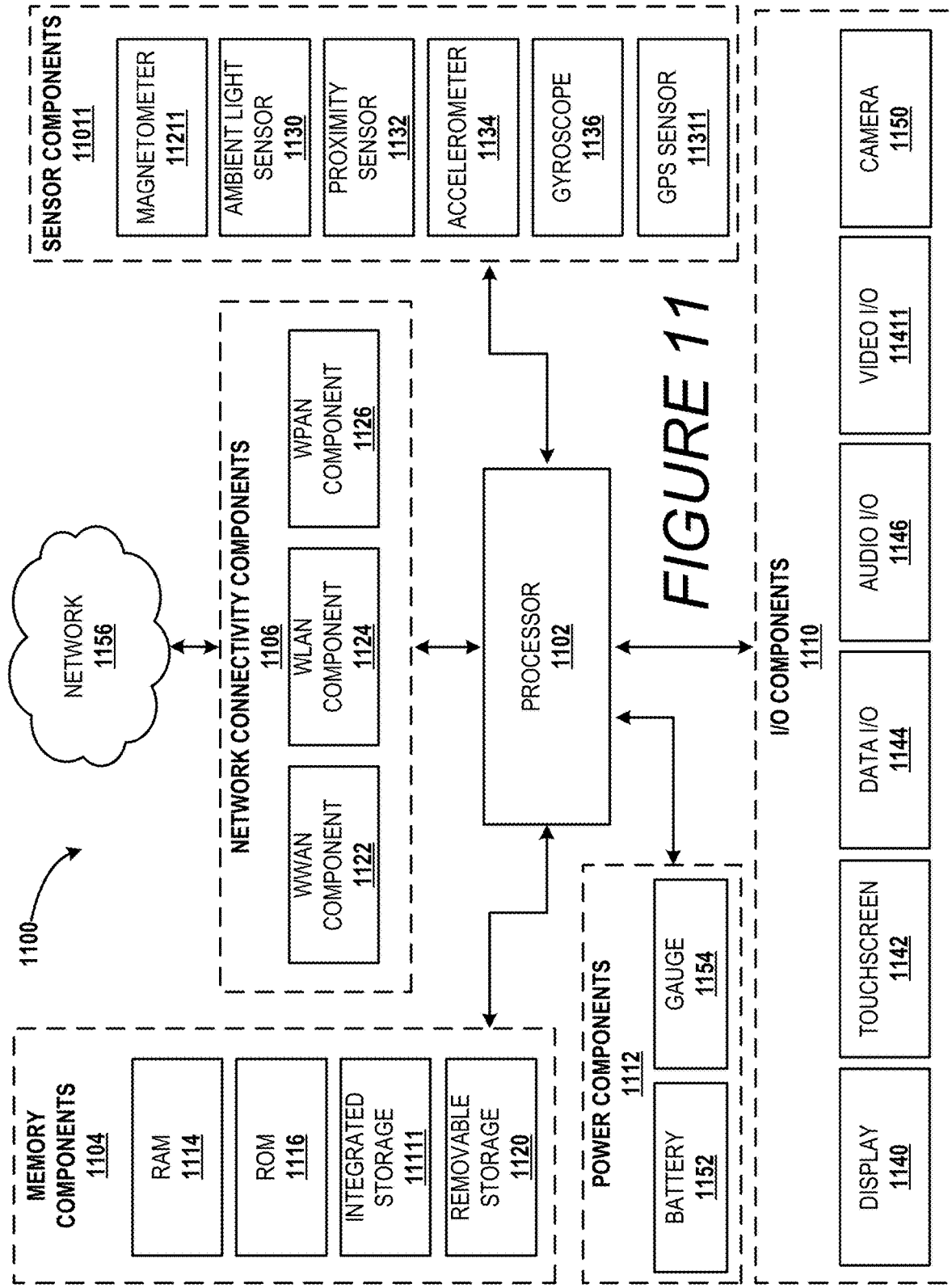

EDITING USING SECURE TEMPORARY SESSION-BASED PERMISSION MODEL IN A FILE STORAGE SYSTEM

PRIORITY APPLICATION

This application claims the benefit of and priority to U.S. Provisional Application No. 62/821,826, filed Mar. 21, 2019, U.S. Provisional Application No. 62/821,781, filed Mar. 21, 2019, U.S. Provisional Application No. 62/821,739, filed Mar. 21, 2019, and U.S. Provisional Application No. 62/821,703, filed Mar. 21, 2019, the entire contents of which are incorporated herein by reference. This application also incorporates by reference U.S. application Ser. No. 16/360,779, filed Mar. 21, 2019.

BACKGROUND

Distributed storage systems (e.g., cloud storage systems) typically use server computers and storage devices, connected to the Internet and/or another type of network, to store computer data and software applications. A device may connect to the servers via a web browser or a dedicated distributed storage application, for instance, to retrieve data, upload data, and/or run software applications. This arrangement may be beneficial for computing devices having limited storage, such as mobile computing devices, which might benefit from the large storage capacity and higher performance of the servers. This arrangement may also be beneficial to generally provide a centralized location for storage of a user's data that can be accessed by multiple devices, regardless of their location.

Distributed storage has become a readily available Internet service (e.g., OneDrive, Dropbox, Google Docs, and Amazon Cloud Drive storage services). Distributed storage enables a user to upload files to a server and disseminate those files to multiple devices based on a system of secure permissions allowing access to a centrally stored set of data. Specially, a file may be created on a user's computer, the file may be uploaded to a server, and the server has user provided instructions on where to send the file or how the file may be accessed.

The use of such cloud-based computing services has greatly increased in recent years. Additionally, the amount of data that users create and store has greatly increased. While much of this data may not include sensitive or confidential information, users often have personal information contained in at least some of their stored data. Such data may include bank statements, account information, social security numbers, and other personal information.

Ensuring that users can secure access to such personal information can be challenging given the total amount of data that a user typically stores in their data files. Furthermore, it is cumbersome to apply extraordinary security measures to all of their data, or to individually apply such measures to each and every sensitive data file. This can lead to a number of inefficiencies, as security features must be applied to data where high levels of security processes are not needed or desired, or the user must repeatedly adhere to such processes. In many applications, such as Word, Excel, OneNote, Pages, Numbers, Google Docs, and Google Sheets, each application may have their own interfaces to data files, and enforcement of security measures for sensitive documents may require that each application implement a security mechanism. However, applications may not apply security features in a consistent manner. This can lead to a number of issues, as applications may not implement the security features in an efficient manner. Furthermore, the user may be required to learn and interact with a variety of security implementations. Such limitations can cause a number of inefficiencies and a less than desirable user experience.

SUMMARY

At least some embodiments of this disclosure are directed to providing a secure area in a distributed storage system. In some embodiments, the secure area may be referred to as a vault, which may be a special folder that requires additional authorization measures such as two-step verification to access the contents or to even view the vault. This folder provides an additional layer of security to files and documents in the event that a user's device or account is compromised. In some embodiments, the additional layer of security may be provided more generally for a class of action or activity rather than to activity tied to a secure area of storage, where the vault may be one type of such activity. It should be understood that while the example implementations described herein refer to the vault, the disclosed principles may be applied to actions or activities that are tied to the additional layer of security.

Once authenticated, the vault may function like a typical folder or other storage container that may be accessed using a file explorer or other application that provides an interface for accessing file systems. In some embodiments, once access to a user's vault is authorized, access to the vault may be allowed in a time-limited manner. The vault may lock after a specified time, requiring re-authentication to continue to access the vault.

In some embodiments, permissions may be granted to a session for the purpose of editing a specified document, to ensure that the user can finish editing the document even after the specified time expires. In this way, while the original user session might time-out, the session used for editing the document will not. In some embodiments, the application may be notified that the vault is locked and that an open document that is stored in the vault should be prepared to be closed. The application therefore may carry out its own efforts to extend the token. An application may automatically extend the vault unlock if any vault item is actively in use.

The techniques disclosed herein provide a number of improvements over existing systems. For instance, when the file is stored at a remote storage service, such as Google Drive, iCloud, or OneDrive, a secure area may be provided that can be used to selectively store files therein rather without having to apply additional security mechanisms to the entirety of the user's files or individually to selected files. The techniques disclosed herein further improve user interaction with a computer along with providing improvements with respect to processing resources, network resources, and memory resources. For instance, a user no longer has to manually apply security measures to individual files or open a separate secure account for storing sensitive files, causing the user to have to manage multiple storage services and accounts. A more simplified way to provide a secure area, as disclosed herein, can lead to the reduction of inadvertent inputs, and based on which other efficiencies can be improved.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 10 is a diagram illustrating a distributed computing environment capable of implementing aspects of the techniques and technologies presented herein.

FIG. 11 is a computer architecture diagram illustrating a computing device architecture for a computing device capable of implementing aspects of the techniques and technologies presented herein.

DETAILED DESCRIPTION

Figure 1:
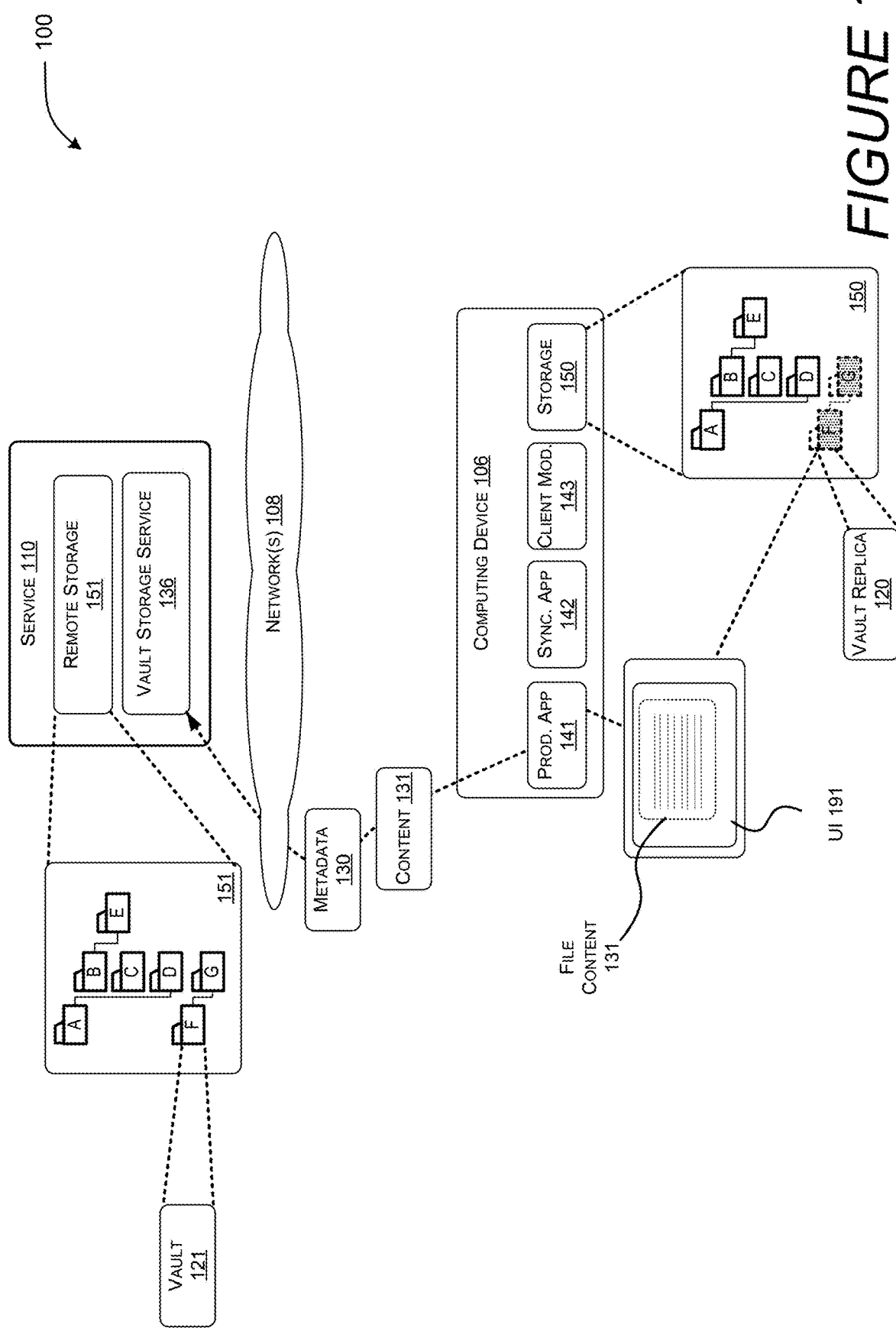
FIG. 1 is a block diagram of a system for providing a secure area in a storage network.

Many users store and access sensitive documents among their stored data. Such sensitive documents may include passports, social security numbers, and other identification information, as well as financial information such as bank statements and account numbers. Not only do users wish to protect such sensitive information and prevent the information from falling into the wrong hands, but it is often desirable that such information be difficult to inadvertently modify or delete.

Existing alternatives require the use of additional password protection for sensitive documents, which may not be integrated with the user's personal cloud. Access is usually granted to a specific user and authenticated via a simple username and password or other single factor authentication scheme. Usernames and passwords are usually stored locally and remembered by the device. After a user sets up a computer for access, the entire personal cloud is accessible. There is no place in the personal cloud for more sensitive documents that require additional authentication. In various embodiments, a mechanism is provided for personal cloud-based storage services to provide a secure area to store more sensitive documents and files. Such an area may require the user to pass additional authentication measures, such as two-factor authentication (TFA) or multi-factor authentication (MFA) or more generally a heightened authentication protocol, to access the secure area. Such additional authentication measures may be required above and beyond the username/password combination or other simple authentication that the user needs to provide to access their cloud-based storage services. Similarly, there is no way for the user to identify actions or activity that are to require strong authentication.

When using role-based access control, roles are typically associated with a given user and not a transient authentication state for that user. In a personal cloud file system, access to files and folders is granted to security principals (users or groups) after authentication is completed, typically by providing a user name and password. In one aspect of the present disclosure, permissions may be granted to a temporary strong authentication state and not the security principal. The disclosure provides a way to grant permissions based on the temporary strong authentication state to a folder or file only when using a specific type of authentication, such as strong authentication, is used. In an embodiment, a user with regular authentication would not be able to see files in the vault and access such files, unless first performing strong authentication. In an embodiment, permissions may be granted based on the temporary strong authentication state to action set that is tied to the overall file system but not necessarily to a specific folder/file. As an example, changing the quota for the entire file system could be one such an action where changing the quota may be tied to the set of operations <view, create, and modify>. Another example may be the emptying of a recycle bin. A temporary strong authentication state may be required in order to allow a user to perform specified actions, for example action that are irreversible or otherwise may have significant impact.

In another aspect, the disclosure provides a way to create a secure portion of a personal cloud file system which requires additional security to access such as strong authentication. In some embodiments, two-factor authentication (TFA) or multi-factor authentication (MFA) is required to access the extra secure folder in the personal cloud file system. The secure portion may be referred to as a vault. The act of providing strong authentication to gain access to this secure portion may be referred to as unlocking the vault. It should be understood that while references may be made to "the vault" or "a vault," there may be multiple vaults associated with a user's storage.

The secure portion may be any portion of a user's file structure. Thus, the vault can be a folder or a volume. Folders can be created within the vault, files and folders can be moved into the vault, and existing folders can be converted into a vault. Other types of data structures may also be protected using the vault. For example, a metadata database storage system may be protected as a vault. Other types of data and file management interfaces may be configured to interface with the vault. In some embodiments, the vault may be managed by a vault storage service, which may provide services to allow various applications to interact with the vault.

In some embodiments, applications may be required to ensure that vaulted items are not cached on the local storage of the user's device, unless the application is using some form of local encryption. If the application needs to provide offline access or caching of vault items, the items and their associated metadata may be stored using encryption and may be protected by strong authentication and/or biometric authentication. For applications that keep track of recently used items, the vault items may not appear in the recently used list unless that list is filtered based on the current vault locking state, thus excluding vault items when the vault is locked. Another example could be a search index containing vault item data that may similarly exclude vault items when locked.

In some embodiments, items in the vault may not allowed to be shared. For example, the command list for vaulted items may exclude "Share." For the root vault folder, "Download" and "Copy" may also be excluded. If shared items are moved into the vault, sharing capability may be removed from those items. Sharing commands (creating sharing links, sending sharing invitations, adding permissions) may fail for items in the vault. To share items, the user may be required to move them out of the vault.

In some embodiments, a warning may be provided before a vault item is moved out of the vault or deleted. If a vault item is deleted, it may be placed in the Recycle Bin. A deleted vault item may retain its vault facet while in the Recycle Bin. When enumerating items in the Recycle Bin while the vault is locked, vault items may be excluded from the results. In some embodiments, vault items may be excluded from search results, even if the vault is unlocked.

The amount of data or the number of objects and files that may be stored in the vault may be limited based on service agreements with the user or whether a user has a subscription to the vault storage service.

In an embodiment, access to the vault may be time-limited. After a predetermined time, the vault may be automatically locked, requiring another authentication to open. If the vault is left unlocked and unused for a specified amount of time, the vault may be automatically locked. This may be referred to as vault auto-lock. The amount of time may be variable. In one embodiment, a time period of 20 minutes may be implemented.

In some embodiments, a vault token may be provided that enables a long-term unlock of the vault. The long-term unlock may enable access to the vault for a longer time period such as 90 days. In some embodiments, the long-term unlock may be usable across multiple sessions. For example, an application may implement a short term unlock using multi-factor authentication, such as 20 minutes, and implement an extension based on additional authorization methods, for example using local biometrics. The vault token may be renewed after the unlock time period.

In various embodiments, the vault permission can be per device or per a specific endpoint. Device independence can be provided even without multi-factor authentication independence. For example, when the vault is unlocked, only the device that initiated the unlock can access the vault. Client access may be specific to the client and the session. A different client, or the same client with a different session, may be required to be separately authenticated.

Before accessing files stored in the vault, an application may be required to unlock the vault. In one embodiment, an unlock API may be implemented that requires a strong authentication token, which the application may obtain before calling the unlock API. After a successful unlock, the application may either receive a vault token which is valid for a longer time period, or the current session may be unlocked for the auto-lock time period. After the unlock operation, the application can discard the strong authentication token. The application may access the vault by using the same session (e.g., the Session ID may be part of the regular authentication token) or by providing the vault token.

MFA may be triggered by specifying an authentication policy. The authorization may be configured such that the entire contents of a user's account does not have to opt into the use of MFA. Rather, MFA can be requested for a specific scenario.

When any operation is requested for an item in the vault, an authorization process may be triggered. The roles assigned may be obtained based on the storage context information and the item may be included in the access control list (ACL). The required roles may be obtained based on the role definition configuration associated with the operation on the item, e.g., session owner. Roles assigned may be compared with the roles required and based on the result, the access may be granted or denied. If access is denied, the error may be provided to the client.

If the vault is to be unlocked, an unlock page may be accessed and the resource ID for vault may be passed. The resource ID may be a unique identifier for an item in the storage service. In one embodiment, the session ID from the ticket may be used as the session ID. In another embodiment, a hash including the user identifier (e.g., PUID) and another value may be used. In one embodiment, the time at which the user last signed in by entering a password may be used. An unlock page may be accessed and an MFA process may be initiated.

In some embodiments, items inside the vault may have a vault facet. This facet may indicate vault-specific information, such as whether the item is in the vault, whether the vault is locked, or the expiration time.

Once unlocked, applications can treat the vault as part of a singular file system, and not have to implement its own protection scheme. The client applications may enumerate files by receiving information about changes in the vault and synchronizing the files locally on the device. For example, the vault may have been created on a different endpoint and may need to be synchronized. Otherwise, the vault may have been created on that endpoint. In either case, the default initial state is locked.

The vault can be extended to mobile and file synchronization clients. The file synchronization client may be configured to maintain security of any content that is synchronized with contents of the vault, including maintaining secure access for locally stored content. The synchronization or mobile client may pass the vault token as a new header for all subsequent calls, otherwise they may not have access to the vault. If the vault token matches the ACL for the item, then access may be granted.

In some embodiments, when vault access is initiated on a mobile device, the mobile device may be enabled to maintain access to the vault based on its own authentication methods, thus allowing for replacing the service side authentication requirements using mobile device methods, such as using biometric inputs that are available for authenticating the user. Based on continued authentication using these methods, the mobile device can continue synchronizing vault content.

Each endpoint (e.g., website, mobile client, and synchronization client) may be able to auto-provision a vault (i.e., trigger the creation of the vault special folder). In one embodiment, settings may be controlled using XML files. The files may be read and parsed at runtime to retrieve the settings defined in the files. Role definitions may define access to each method and property based on roles. The Session Owner may be one role that is assigned and granted when the vault folder is unlocked. A Session Owner role may be required to create vault sub-items. In an embodiment, items stored in the vault may be arranged in a hierarchy, and child items may inherit policies and behaviors from their parents. Items in the hierarchy that define policies and behaviors that children can inherit may be referred to as components.

When the user clicks on the vault, client-side logic may be invoked that causes an embedded browser window to open which is configured to prompt the user to perform strong authentication such as MFA. Mobile clients may support client specific lock/unlock while maintaining server access. The synchronization client may rely on server-side lock/unlock. Locking of the vault may cause the files associated with the vault to be deleted when a subsequent call is made to identify changes.

In some embodiments, the vault storage service may relax requirements to add data to the vault, but require a higher degree of authentication to view, edit, move, or delete the data in the vault.

In the following examples, the additional authentication measures required for accessing the vault is multi-factor authentication (MFA) but it should be understood that other authentication measures may be implemented. In an embodiment, when a user successfully signs in using MFA, an access token may be issued and associated with the current session. In one embodiment, the token may be associated with the user's ID and an ID for the partition. The current session ID may be added to the access control list (ACL). Access to the vault may then be made available, and a role may be assigned to the user. The role may be used in part to access vault content. In some embodiments, access to the vault may be tied to a session on a specific device via a device ID if available.

If the application chooses to use the regular token which includes the Session ID for access after a vault unlock, then such an access may be a short-term unlock. The vault may lock that session after the lock timeout, and the application may extend the unlock regularly to continue to access the vault. If the application does not perform any vault operation for the lock timeout, the session unlock may expire and a new unlock may be required. If the user signs out and then signs back in, a new session may be created and a new unlock may be required.

In some embodiments, the vault may be implemented as a special folder that may be configured with a role definition and vault folder root. The role definition configuration for the vault may include vault folder root as the role definition of the top-level vault folder. The vault may be created using a pre-configured template where the details of creation are abstracted.

The current disclosure describes granting permissions primarily to a temporary authenticated session. By granting permissions, the vault storage service can also maintain a record of who has the vault open currently. The vault storage service may also revoke access by locking the vault based on the auto-lock timeout or other factors. By maintaining locking control, the vault storage service can enforce a consistent level of security by not depending on the user to adhere to security practices. The vault storage service may maintain locking control by revoking permissions, for example by controlling the ACL. In some embodiments, the revocation of access to the vault may cause a deletion of any locally saved copies of vaulted documents to be deleted from the device.

Actions initiated on a vaulted document may be allowed based on an inheritance from the original session, thus allowing for additional sessions to be spun off of the original session. For example, MFA may be performed initially to authenticate the session, and further configurations may be launched to provide a more tailored level of access. For example, a secondary or child token associated with a secondary policy may be generated for different contexts. The secondary or child token may be based in part on the state of the first token. In some embodiments, the additional sessions can be disjoint. The additional sessions may be associated to the original session where the original can impact the derived sessions in some manner. For example, the session lifetime of the secondary sessions may be updated by refreshing the lifetime of the original session. Thus, the secondary or child token policy may be disjoint or derived from the original token, and the lifetime of the secondary or child token may be disjoint or tied to the original token.

In some embodiments, a file restoration function may be used to revert the vault to a previous point in time. If a user has a vault, accessing the file restoration function may require unlocking the vault. APIs related to the file restoration function may require the vault to be unlocked.

In some embodiments, while the file restoration function may undo actions related to items in the vault, the file restoration function may not undo the creation or deletion (disabling) of the vault itself. In one embodiment, during a file restoration, creating and deleting the vault root folder may be treated as irreversible.

When time-limited permissions are granted to users using MFA as described herein, the session time limit may be reached even though the user is in the middle of editing a document. If the document becomes locked before the document can be saved and the application closed, unexpected results or failures can occur. Additionally, some applications may not be configured to interact with vault functionality, and may not have be able to handle a sudden loss of access to files from the vault.

In some embodiments, the auto-lock can be postponed if it is determined that the user has a vaulted file open and is actively editing the file. In some embodiments, a decision based on heuristics can be made as to when to lock the vault. The decision may further be based on a number of factors such as the level and types of user activity, length of time since the TFA, and so forth. By providing an area that is accessible for limited time via strong authentication, a user can continue to access files in the vault for that time limit without having to be authenticated for every operation.

In another aspect of the present disclosure, permissions may be granted to a session for the purpose of editing a specified document, to ensure that the user can finish editing the document even after the temporary vault permission expires. In this way, while the original user session might time-out, the session used for editing the document will not. In some embodiments, the application may be notified that the vault is locked and that an open document that is stored in the vault should be prepared to be closed. The application therefore may carry out its own efforts to extend the token. An application may automatically extend the vault unlock if any vault item is actively in use. The application may also warn the user when the vault unlock is about to expire due to inactivity and offer the option to extend the vault unlock. The application may further provide an option to lock the vault manually and thus revoking the existing vault unlock.

An extended or longer-lived token allows for the tailoring of user actions and experiences for situations with varying levels of security. Once an MFA is performed and vault access is granted, the vault may be configured to grant further authorizations with varying levels of security, such as launching a browser session, launching an editing session for a file, unlocking a mobile device, and the like. Entries may be included in the vault ACL to allow these secondary actions.

In some embodiments, a new session may be authorized solely for the purpose of editing a specified document. Although the vault may time out and lock for the original session, the session used for editing the document may not be impacted. The granted permission may be scoped to the document being edited. In some embodiments, when the vault is unlocked, the session may only be granted access to a specified file or document.

In some embodiments, the vault storage service may enable compatibility between an operating environment that is configured to interact with the vault mechanism, and one that is not configured to interact with the vault mechanism. The operating environment may obtain a token on behalf of a legacy application that is not configured to interact with the vault. The operating environment may broker the vault token extension and management although the legacy application is not specifically configured to handle interactions with the vault.

Portions of a cloud file system can implement different capabilities as it evolves over time. However, older applications might fail to interact with the new capabilities and even stop working after a cloud file system update. For example, in a cloud file system where specific folders have special capabilities or restrictions such as a vault as disclosed herein which has a special MFA requirement, some existing applications might behave incorrectly, fail to read the folders or files, or stop working altogether as special folders with new capabilities are introduced. Additionally, such applications may incorrectly handle the information in the vault and pose a security risk. Typical solutions would require clients and servers to agree on specific capabilities based on version levels and interface definitions. Those would require clients and servers to have a prior agreement on version levels and capabilities.

In another aspect of the disclosure, applications may be required to add a special header in order to be provided access to the vault. Applications that do not provide this header may not be allowed to access the vault. Applications that provide the special header may further be required to provide a strong authentication token to unlock the vault before accessing any vault content. The strong authentication token may be requested from an account management service and passed to the vault storage service via an application programming interface (API). In some embodiments, this may be required for every unlock request, even if the user is already signed in with two-factor authentication. For example, an application may pass an opt-in header in API requests to the vault storage service to indicate awareness of the vault, and the application may be provided information pertaining to the vault, such as an indication of its location in the file system, before the vault is unlocked. If the opt-in header is not provided by the calling application, then the vault may be hidden from the application even if an authorization token is provided. Applications that provide the opt-header may be referred to as a vault-aware application. In this way, older applications may continue to function unchanged, with the new portions being hidden and thus not requiring action from the application.

In one embodiment, applications that support the vault may include a "prefer" request header with every request related to the vault. For example, Prefer: Include-Feature=vault. Applications that do not include this header may not see a vaulted folder or any items under it.

Alternative implementations may address this issue with a hidden flag or system flag in the file system. However, such methods may reveal information about the existence of the hidden objects. The described embodiments allow for customization on a per application basis without having to store status information for every application or otherwise store states on a per device or customization per device level, requiring extensive storage semantics. The described embodiments also allow for flexibility based on the context of the call. The described embodiments further allow for compatibility to be confirmed without tracking version levels.

In a cloud-based file system where specific folders have special capabilities or restrictions such as the vault which has a special MFA requirement as described herein, the vault may be available when it is unlocked, and unavailable when it is locked. When the vault is locked, the folders and files within the vault may appear to disappear. The local file visualization system must determine whether to remove from the local file system, or otherwise distinguish between files that are hidden due to the locking of the vault or files that no longer appear due to an actual deletion.

In another aspect of the disclosure, files and folders that are locked in a vault, and that do not currently have an active and authorized session, can be shown as locked by the file system instead of deleting the locked items. In some embodiments, the list of items within a locked area may not be otherwise visible, thus not allowing the existence of such items from being exposed. In some scenarios, this may be desirable to provide the minimum information needed to provide status for the locked items without exposing specific information about the items.

In an embodiment, tombstones may be used to identify items that are vaulted and locked. Many clients provide support tombstones for soft and hard deleted items. A tombstone indicates to a client that the item should be shown as deleted and/or should be hidden. To indicate to vault-aware clients that an item must be removed from disk and not to be moved to the recycle bin, a "locked" property may be included in tombstones. Vault-aware clients may use this property to determine that a file should be deleted locally. The additional property may be completely transparent to legacy clients.

By using tombstones to indicate to the client that the item is no longer visible on that client and should be deleted, clients that are not configured to interact with the vault can be notified that the locked items are no longer available. The client may determine which local actions to take based on this information. This may allow for applications that are not configured to interact with vaulted items to effect an action that is suitable or otherwise consistent with the locking of a vaulted item. Thus, when the vault is locked, clients may locally delete vaulted items.

At least two types of authorization may be implemented. A full trust first party authorization may be used by the synchronization client and mobile client. A delegation authorization may be used to obtain a consent-less access token. To access the user's vault stored in the cloud, the MFA must be successful. To perform any create, read, update, and delete operations against files in the vault, clients must have an active authorization that has been MFA'd within the timeout period.

FIG. 1 illustrates a system 100 that enables users to create and access a vault. In one illustrative example, the system 100 comprises at least two computing devices: a client computing device 106 and a server computer operating a remote storage service 110 (also referred to herein as a "remote service 110") and a vault storage service 136 (also referred to herein as a "vault service 136"). The system 100 can also include one or more networks 108 for enabling the computing devices to communicate. This example is provided for illustrative purposes and is not to be construed as limiting. It can be appreciated that the system 100 can include any number of computers, including a number of client computers simultaneously editing a single file stored at the client computers and one or more server computers facilitating the remote storage service 110.

The remote service 110 and vault storage service 136 can be in the form of a personal computer, a server farm, a large-scale computer system or any other computing system having components for processing, coordinating, collecting, storing, and/or communicating data between one or more computing devices. Examples of such services include storage services provided by OneDrive, Dropbox, Microsoft, Amazon, Apple, Google, etc.

The service 110 can also include one or more storage units 151, also referred to herein as "remote storage 151." The remote storage 151 can comprise a storage structure that defines a number of directory locations. For instance, the remote storage 151 can include a directory structure having a plurality of folders, e.g., locations (A through G). The folders may have a hierarchy, as shown in FIG. 1, and each folder can store one or more files and/or folders.

The client computing device 106 can be in any suitable form, such as a phone, laptop computer, desktop computer, tablet, etc. The client computing device 106 can include a productivity application 141, a synchronization application 142, a client module 143, and local storage 150. The client module 143 can provide functionality for executing aspects of the operations disclosed herein, which can be in coordination with vault storage service 136.

The productivity application 141 provides functionality for enabling users to edit the contents 131 of a vault file 120. For instance, a productivity application 141 can include a word processing application that edits text and images within a document. In other examples, the productivity application 141 can include a spreadsheet application, a presentation application, a drawing application, or any other suitable application for editing the contents 131 of a vault file 120. The content of the vault file can include text data, image data, video data, mark-up language, or data of any other format that can define an idea, object, description, images, preferences, etc. In some configurations, the productivity application 141 can display a graphical user interface displaying an authoring pane 191 for displaying the contents 131 of the vault file 120.

The synchronization application 142 manages files and the folders stored on the client computing device 106 and synchronizes the files and folders with the remote storage service 110. The synchronization application 142 manages aspects of the namespace of the client computing device 106. For illustrative purposes, a typography namespace modification to a file includes a modification of the file name and/or a modification to the location of the file. A file may move from an originating location to a destination location. Renaming a file and/or moving a file to a destination location is also referred to herein as a modification to a file's namespace topography. The synchronization application 142 can maintain a database with respect to files stored on the client computing device 106. The database can comprise a number of file attributes, including a filename and a directory location, which can be used to coordinate file synchronization with the service 110.

The vault storage service 136 and the synchronization application 142 can communicate with one another to coordinate the status of a vaulted file. For instance, the vault storage service 136 can lock a file. While a file is locked, the vault storage service 136 can prevent the synchronization application 142 from seeing the file or applying any changes to the file. The productivity application 141 can also send requests to the vault storage service 136 to access the vaulted file 121, which may have a local replica 120. The synchronization application 142 can also provide information regarding a vaulted file, e.g., machine identifier to indicate a computer on which edits are made, and other data indicating when a file was last synchronized with the vault storage service 136. Such information can enable the productivity application 141 to coordinate with the vault storage service 136.

The local storage 150 can comprise a structure that defines a number of file locations. For instance, the local storage 150 can include a directory structure having a plurality of folders (A through D). The folders may have a hierarchy, as shown in FIG. 1, and each folder can be used to store one or more files. For illustrative purposes, the local storage 150 includes five (5) valid folders (A through D) and two vaulted folders (F and G).

A process of creating a vaulted file can begin with a request. The request can identify a desired directory location where the vaulted file is to be created. The location can be identified in a number of ways, for instance, the location can be identified by a path of file directories, an address, a namespace, or any other suitable data indicating a location within a directory structure. In one illustrative example, the location can include a OneDrive namespace. For illustrative purposes, the location provided in the request is also referred to herein as a "requested location."

Figure 2:
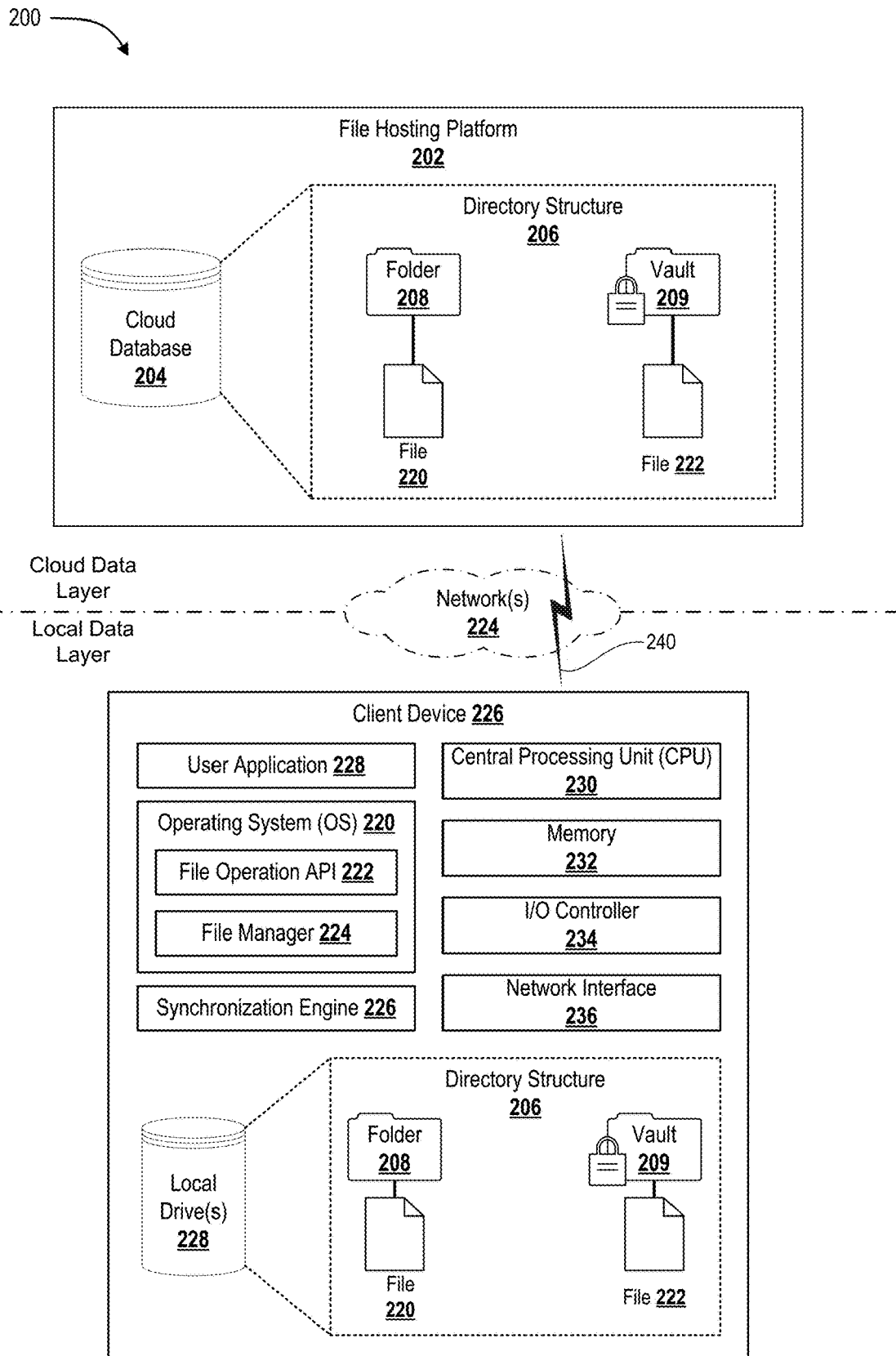
FIG. 2 is a block diagram showing further details in a system for providing a secure area in a storage network.

Referring to FIG. 2, illustrated is another example system 200 including a client device 226 and a file hosting platform 202 configured to maintain copies of files in a cloud database 204. The client device 226 may have a file I/O manager. For example, when performing an operation on a moved file or folder 220(M) of an individual file or folder 220 at a local drive 228 (e.g., a SATA-type solid-state hard drive and/or any other suitable drive-type) of the client device 226, the system 200 may cause the file hosting platform 202 to locate content data 222 for the file or folder 220 within the cloud database 204, depending on where the folders are located, relative to the sync root. Accordingly, as illustrated, an instance of the moved file or folder 220(M) that is stored at the cloud database 204 can be synchronized with the content data 222. Example file hosting platforms 202 include, but are not limited to, DROPBOX, BOX, GOOGLE DRIVE, MEGA, PCLOUD, SUGARSYNC, AMAZON DRIVE, and/or MICROSOFT ONEDRIVE.

In some embodiments, the file hosting platform 202 may include a directory structure 206 for storing data associated with one or more files or folders 220 within the cloud database 204. As used herein, the term "directory structure" may refer generally to any scheme with which a file system may cause files to be displayed to a user. An example directory structure includes, but is not limited to, an electronic folder structure. In the specific embodiment of FIG. 2, the directory structure 206 may include one or more folders 208 at which one or more files or folders 220 are stored. As used herein, the term "folder" may refer to a directory defined in a hierarchical file system cataloging structure and may include references to individual ones of the one or more files 220 and/or other folders 220. The directory structure may also include a vault folder 209 that includes a file 222. As further illustrated, the local counterpart to the file 220 and vaulted file 222 may be synchronized dehydrated within the directory structures 206 at the local drive 228 and file hosting platform 202.

As used herein, the term "synchronized" may be used as a descriptive term to indicate that an instance of a file or folder 220 at a particular storage location (e.g., the cloud database 204, the local drive 228, etc.) has its corresponding content data 222 also stored at the particular storage location. For example, in the illustrated example, the instance of the file or folder 220 that is stored in the cloud database 204 can be described as a synchronized file or folder if its content data is also stored within the cloud database 204.

In some embodiments, the client device 226 may include a user application 228 that provides access to the one or more files 220 in accordance with the directory structure 206. For example, the user application 228 may cause the client device 226 to display a file-browser graphical user interface (GUI) that enables a user to navigate through the directory structure 206. As a more specific but nonlimiting example, the user application 228 may cause the client device to display graphical folder representations for individual ones of the folders 208 and may further display file icons within the graphical folder representations to enable the user to view the status of a file, and in some embodiments, to open, move, delete, or copy files contained within the folders 208.

In some embodiments, the user application 228 may communicate with one or more components of an operating system (OS) 220 for the purpose of displaying the file-browser GUI and/or for facilitating the generation of selection data that indicates a file or folder 220 and a destination path within the directory structure 206 to copy or move the file or folder 220 to. The OS 220 may be any suitable system software for managing computer hardware and/or software resources and for providing services to the user application 228 and/or other applications (not shown). An example OS 220 may include, but is not limited to, various versions of MICROSOFT WINDOWS (e.g., WINDOWS 8.2 or 20, WINDOWS EMBEDDED STANDARD 7, etc.) and/or various versions of macOS (e.g., macOS HIGH SIERRA etc.).

In some examples, the user application 228 may communicate with a file manager 224 of the OS 220. Example file managers include, but are not limited to, the FILE EXPLORER component of MICROSOFT WINDOWS and/or the FINDER component of the family of MACINTOSH operating systems developed by APPLE, INC. In some examples, the user application 228 may communicate with a file operation application programming interface (API) 222 of the OS 220. The file operation API 222 may include an abstraction of a data reading functionality that causes the client device 226 to read data from a specified file or folder and a data writing functionality that causes the client device 226 to write data to a specified destination path. Example user applications 228 include, but are not limited to, desktop client applications that are specifically configured to communicate with the file hosting platform 202 (e.g., the DROPBOX APP desktop application developed by DROPBOX, the BOX DRIVE desktop application developed by BOX, and/or, the ONEDRIVE desktop client). Accordingly, it can be appreciated that in various implementations the user application 228 may be configured to maintain a local instance of the directory structure 206 and to enable the user to browse through the local instance of the directory structure 206 without continuously communicating with the file hosting platform 202.

In some implementations, the client device 226 may include a synchronization engine 226 for synchronizing the local instance of the directory structure 206 that resides at the client device 226 with a cloud instance of the directory structure 206 that resides on the cloud database 204. Example synchronization engines 226 include, but are not limited to, SYNCHRONIZATION API developed by DROPBOX, BACKUP AND SYNCHRONIZATION developed by GOOGLE, and the ONEDRIVE sync engine. Accordingly, it can be appreciated that the synchronization engine 226 may be a native component of the OS 220 or may be an add-on component that is downloaded and installed onto the client device 226 separate from the OS 220.

As further illustrated, the client device 226 includes a central processing unit ("CPU") 230 that is connected, via a bus (not shown), to various components such as the local drive 228, a memory 232, an input/output (I/O) controller 234, and/or a network interface 236. It can be appreciated that the system components described herein (e.g., the user application 228, the OS 220, and/or the synchronization engine 226) may, when loaded into the CPU 230 and executed, transform the CPU 230 and the overall client device 226 from a general-purpose computing system into a special-purpose computing system customized to facilitate the functionality presented herein. The CPU 230 may be constructed from any number of transistors or other discrete circuit elements, which may individually or collectively assume any number of states. More specifically, the CPU 230 may operate as a finite-state machine, in response to executable instructions contained within the software modules disclosed herein. These computer-executable instructions may transform the CPU 230 by specifying how the CPU 230 transitions between states, thereby transforming the transistors or other discrete hardware elements constituting the CPU 230.

The local drive 228 and associated computer-readable media provide non-volatile storage for the client device 226. Although the description of computer-readable media contained herein refers to a mass storage device, such as a solid-state drive and/or a hard disk, it should be appreciated by those skilled in the art that computer-readable media can be any available computer storage media or communication media that can be accessed by a computing architecture such as, for example, the system 200. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the client device 226. For purposes of the claims, the phrase "computer storage medium," "computer-readable storage medium," and variations thereof, does not include waves, signals, and/or other transitory and/or intangible communication media, per se.

The I/O controller 234 may receive and process input from a number of other devices, including a keyboard, mouse, or electronic stylus (not shown in FIG. 2). Similarly, the I/O controller 234 may provide output to a display screen (e.g., to display the file-browser GUI described herein), a printer, or other type of output device (also not shown in FIG. 2). The network interface 236 may enable the client device 226 to connect to one or more network(s) 224 such as a local area network (LAN), a wide area network (WAN), a wireless local area network (WLAN), or any other suitable network for passing information between the client device 226 and the file hosting platform 202.

Figure 3:
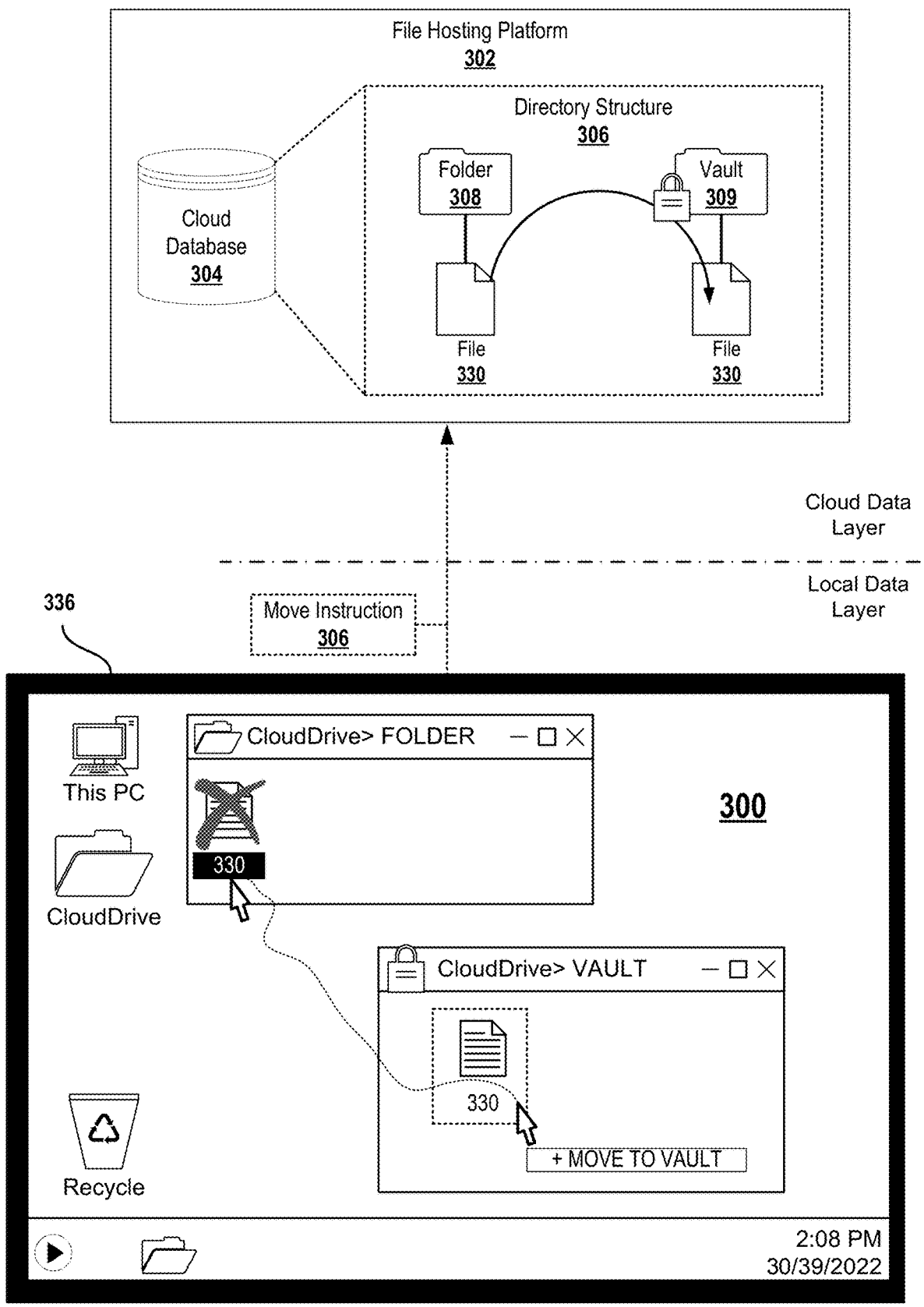
FIG. 3 illustrates an example user interface showing a secure area in a storage network.

Referring to FIG. 3, an example file-browser GUI 300 is illustrated that can be displayed at the client device 336 in association with the user application 338 to enable a user to enter commands for file or folder operations within the directory structure 306. In the illustrated example, a user is performing a drag-and-drop gesture to move a file 330 from a folder 308 to a vault 309. Based on the drag-and-drop gesture, the user application 338 generates selection data that indicates the file 330 as well as a destination path within the directory structure 306 to move the first file 330 to. As further illustrated, the client device 336 may generate the move instruction 206 based on the selection data and, ultimately, may transmit at least some aspects of the move instruction 306 to the file hosting platform 302 in accordance with the techniques described herein.

In some embodiments, the file-browser GUI 300 may be configured to graphically indicate a status for file 330. In the illustrated example, the file-browser GUI 300 is graphically representing a file within the folder 308. The file-browser GUI 300 is also graphically representing the vault 309 as indicated with a lock icon. Thus, a user can tell from the lock icon that the folder 309 is a vault. In various implementations, a user may be able to designate which folders to be converted to a vault.

Figure 4:
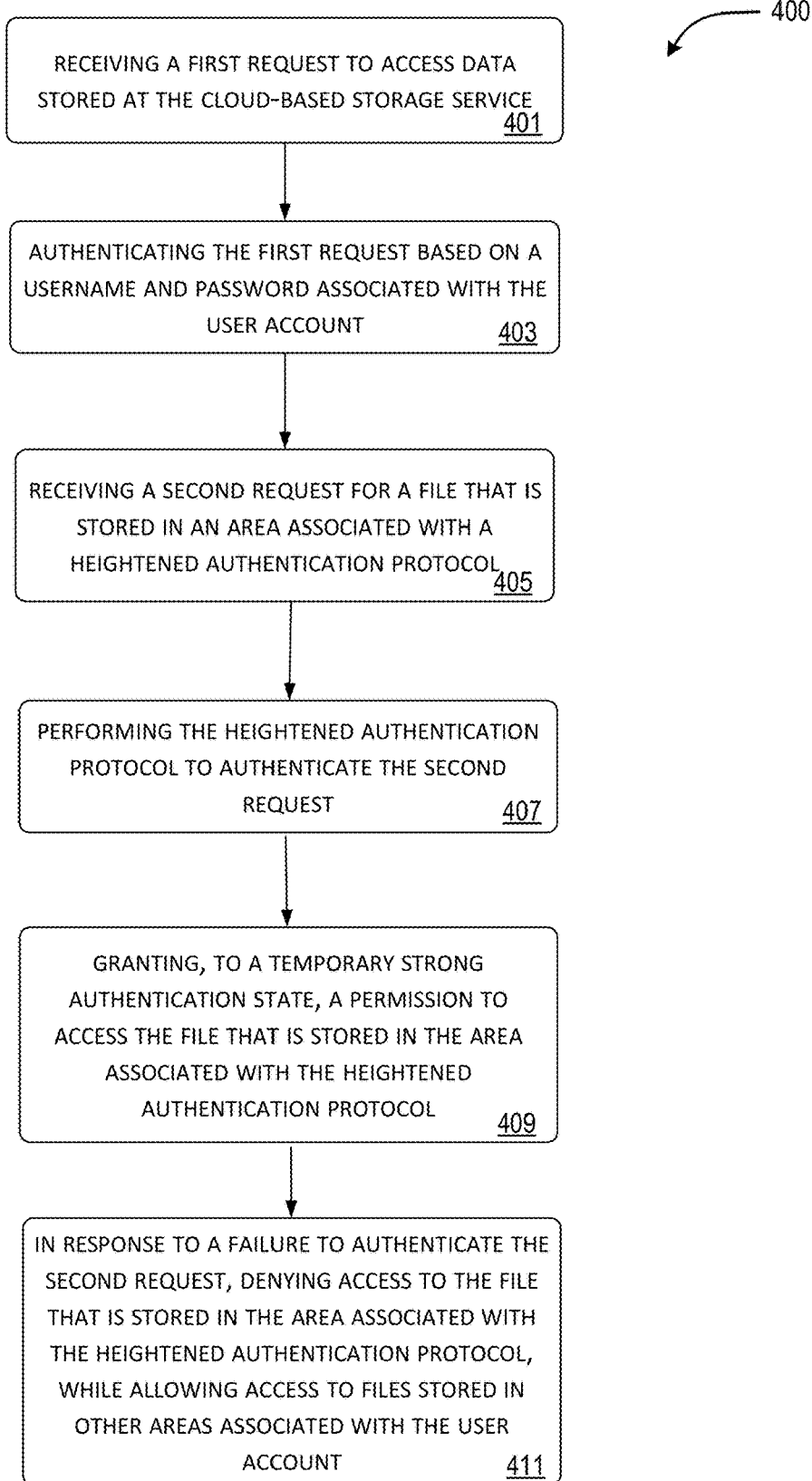
FIG. 4 is a flow diagram showing aspects of a routine for providing a secure area in a storage network.

Turning now to FIG. 4, aspects of a routine 400 for controlling access to data stored in a cloud-based storage service are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, the routine 400 begins at operation 401 where a first request to access data stored at the cloud-based storage service is received at the cloud-based storage service. In an embodiment, the data is associated with a user account.

Next, at operation 403, the first request is authenticated based on a username and password associated with the user account.

Operation 405 illustrates receiving, at the cloud-based storage service, a second request for a file that is stored in an area associated with a heightened authentication protocol.

Next, at operation 407, the heightened authentication protocol is performed to authenticate the second request.

At operation 409, in response to authenticating the second request, a permission to access the file that is stored in the area associated with the heightened authentication protocol is granted to a temporary strong authentication state.

At operation 411, in response to a failure to authenticate the second request, access to the file that is stored in the area associated with the heightened authentication protocol is denied, while access to files stored in other areas associated with the user account is allowed.

Figure 5:
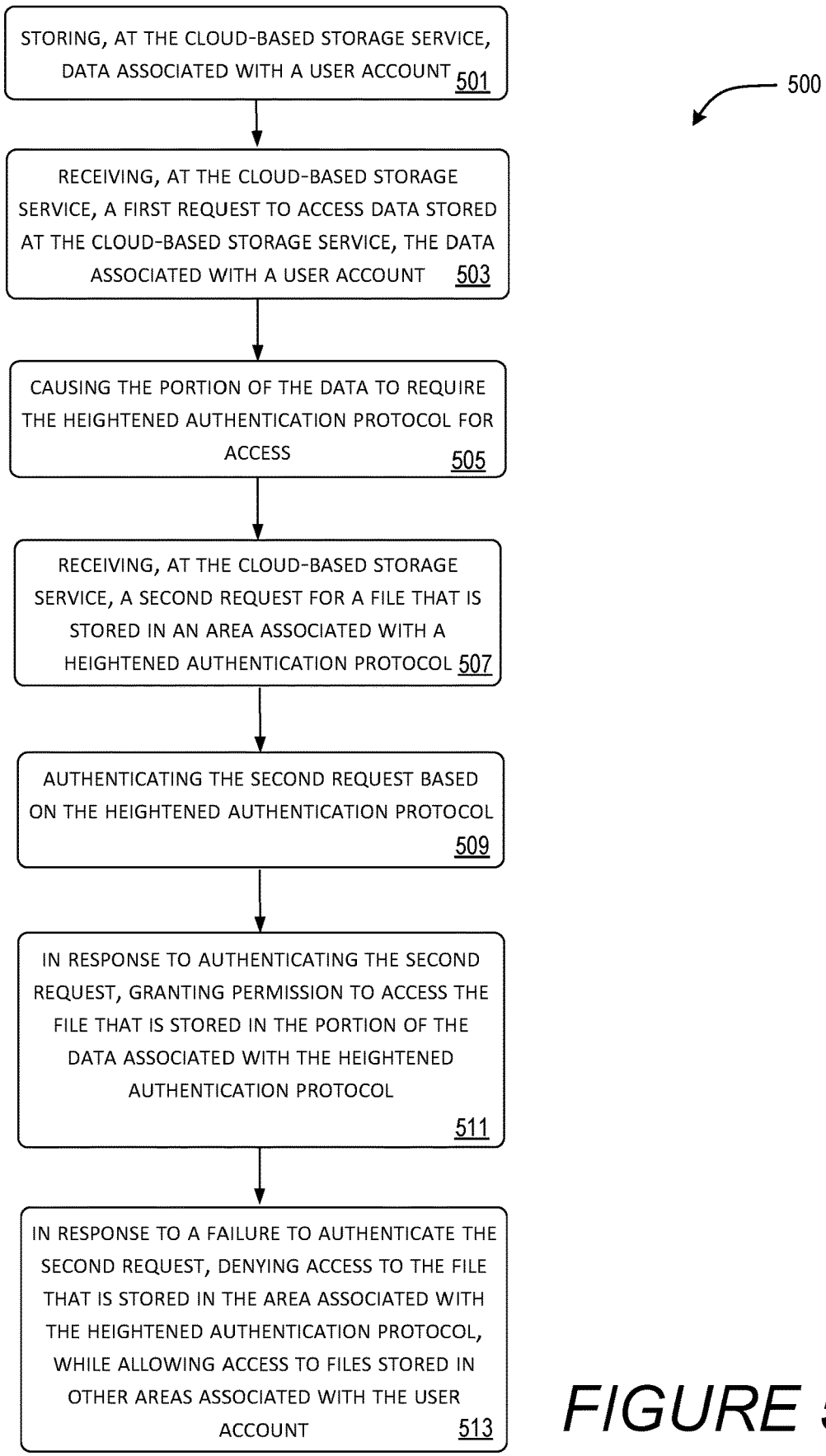
FIG. 5 is a flow diagram showing aspects of a routine for providing a secure area in a storage network.

Turning now to FIG. 5, aspects of a routine 500 for controlling access to data stored in a cloud-based storage service are shown and described below. With reference to FIG. 5, the routine 500 begins at operation 501 which illustrates storing, at the cloud-based storage service, data associated with a user account.

Next, operation 503 illustrates receiving, at the cloud-based storage service, a first request to cause a portion of the data to be associated with a heightened authentication protocol.

Operation 505 illustrates in response to the first request, causing the portion of the data to require the heightened authentication protocol for access.

Next, operation 507 illustrates receiving, at the cloud-based storage service, a second request for a file that is stored in the portion of the data that is associated with the heightened authentication protocol.

Operation 509 illustrates authenticating the second request based on the heightened authentication protocol.

Operation 511 illustrates in response to authenticating the second request, granting permission to access the file that is stored in the portion of the data associated with the heightened authentication protocol.

Operation 513 illustrates in response to a failure to authenticate the second request, denying access to the file that is stored in the portion of the data associated with the heightened authentication protocol, while allowing access to files stored in other areas associated with the user account based on an authentication based on a simple or basic authentication mechanism associated with the user account.

Figure 6:
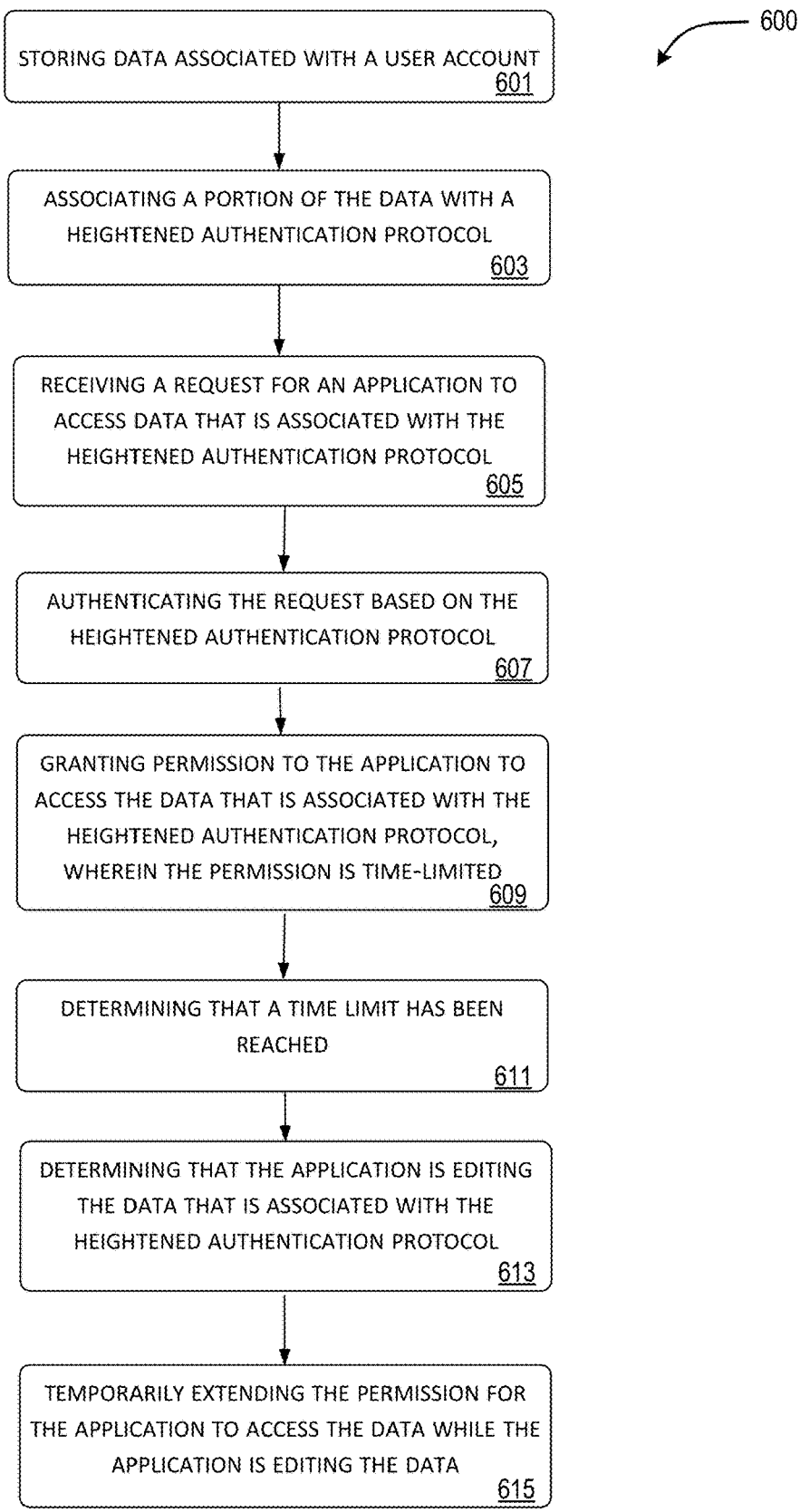
FIG. 6 is a flow diagram showing aspects of a routine for providing a secure area in a storage network.

Turning now to FIG. 6, aspects of a routine 600 for controlling access to data stored in a cloud-based storage service are shown and described below. With reference to FIG. 6, the routine 600 begins at operation 601 where data associated with a user account is stored at the cloud-based storage service.

Next, at operation 603, a portion of the data is associated with a heightened authentication protocol.

Operation 605 illustrates receiving, at the cloud-based storage service, a request for an application to access data that is associated with the heightened authentication protocol.

Next, at operation 607, the request is authenticated based on the heightened authentication protocol.

At operation 609, in response to authenticating the request, permission is granted to the application to access the data that is associated with the heightened authentication protocol. In an embodiment, the permission is time-limited.

At operation 611, it is determined that a time limit has been reached.

Operation 613 illustrates in response to determining that the time limit has been reached, determining that the application is editing the data that is associated with the heightened authentication protocol.

Operation 615 illustrates temporarily extending the permission for the application to access the data while the application is editing the data.

Figure 7:
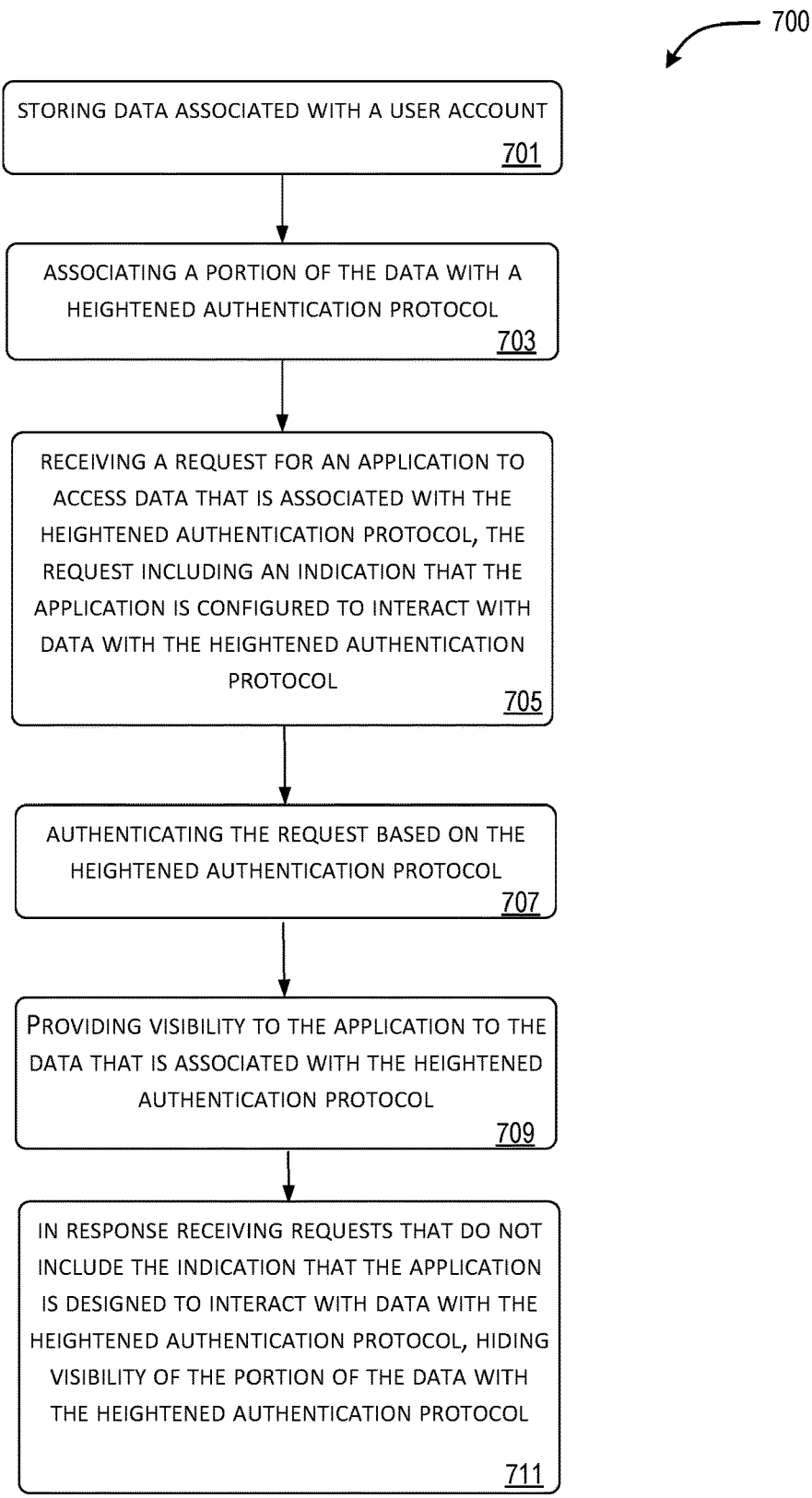
FIG. 7 is a flow diagram showing aspects of a routine for providing a secure area in a storage network.

Turning now to FIG. 7, aspects of a routine 700 for controlling access to data stored in a cloud-based storage service are shown and described below. With reference to FIG. 7, the routine 700 begins at operation 701 where data associated with a user account is stored at the cloud-based storage service.

Next, at operation 703, a portion of the data is associated with a heightened authentication protocol.

Operation 705 illustrates receiving, at the cloud-based storage service, a request for an application to access data that is associated with the heightened authentication protocol. In an embodiment, the request includes an indication that the application is designed to interact with data with the heightened authentication protocol.

Next, at operation 707, based on the indication, the request is authenticated based on the heightened authentication protocol.

At operation 709, in response to authenticating the request, visibility is provided to the application to the data that is associated with the heightened authentication protocol when the request includes an indication that the application is designed to interact with data with the heightened authentication protocol.

Operation 711 illustrates hiding visibility of the portion of the data with the heightened authentication protocol when the request does not include the indication that the application is designed to interact with data with the heightened authentication protocol.

Figure 8:
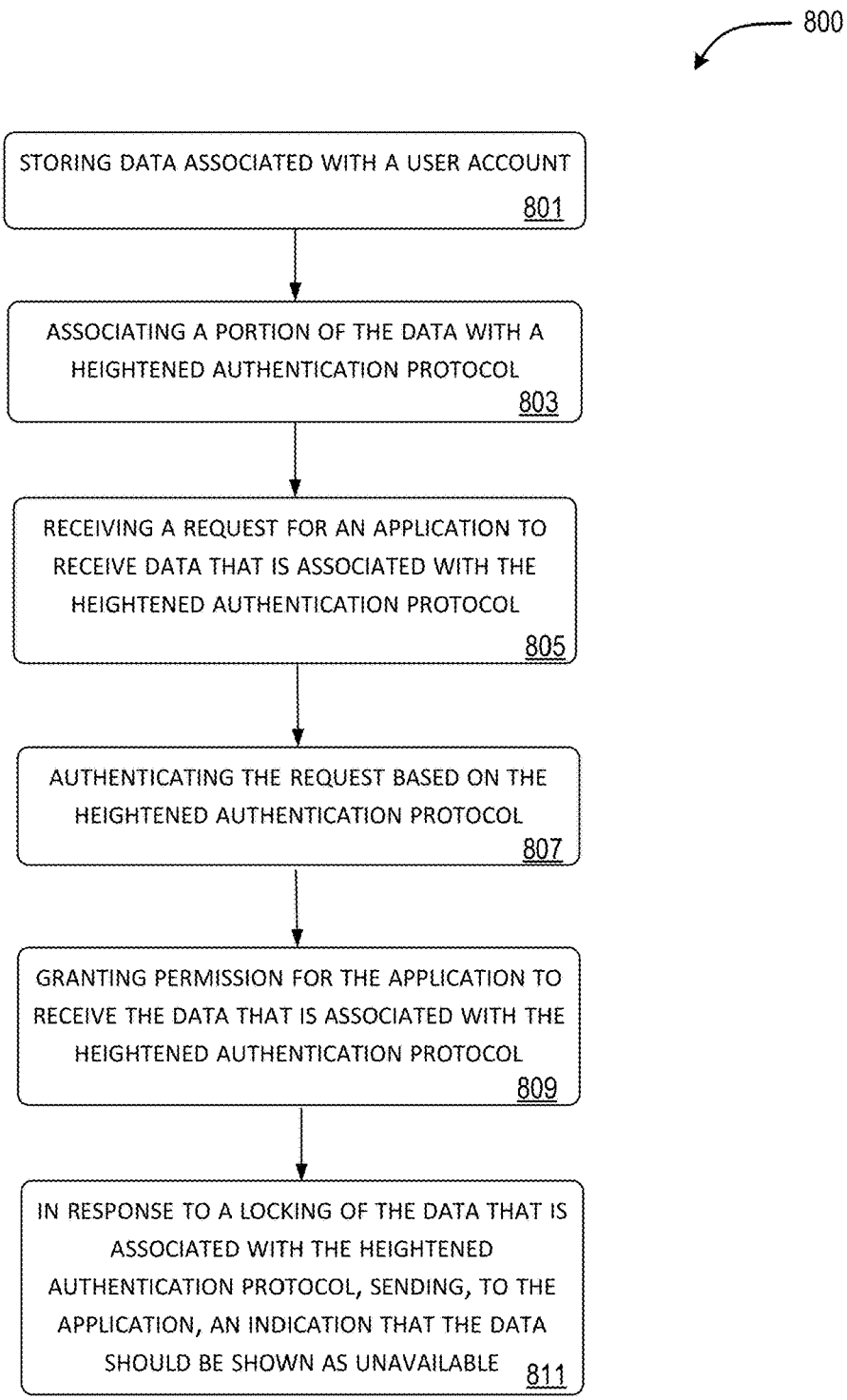
FIG. 8 is a flow diagram showing aspects of a routine for providing a secure area in a storage network.

Turning now to FIG. 8, aspects of a routine 800 for facilitating access to data stored in a cloud-based storage service are shown and described below. With reference to FIG. 8, the routine 800 begins at operation 801 where data associated with a user account is stored at the cloud-based storage service.

Next, at operation 803, a portion of the data is associated with a heightened authentication protocol.

Operation 805 illustrates receiving, at the cloud-based storage service, a request for an application to receive data that is associated with the heightened authentication protocol.

Next, at operation 807, in response to the request, the request is authenticated based on the heightened authentication protocol.

At operation 809, in response to authenticating the request, permission is granted for the application to receive the data that is associated with the heightened authentication protocol.

Operation 811 illustrates in response to a locking of the data that is associated with the heightened authentication protocol, sending, to the application, an indication that the data is unavailable.

Figure 9:
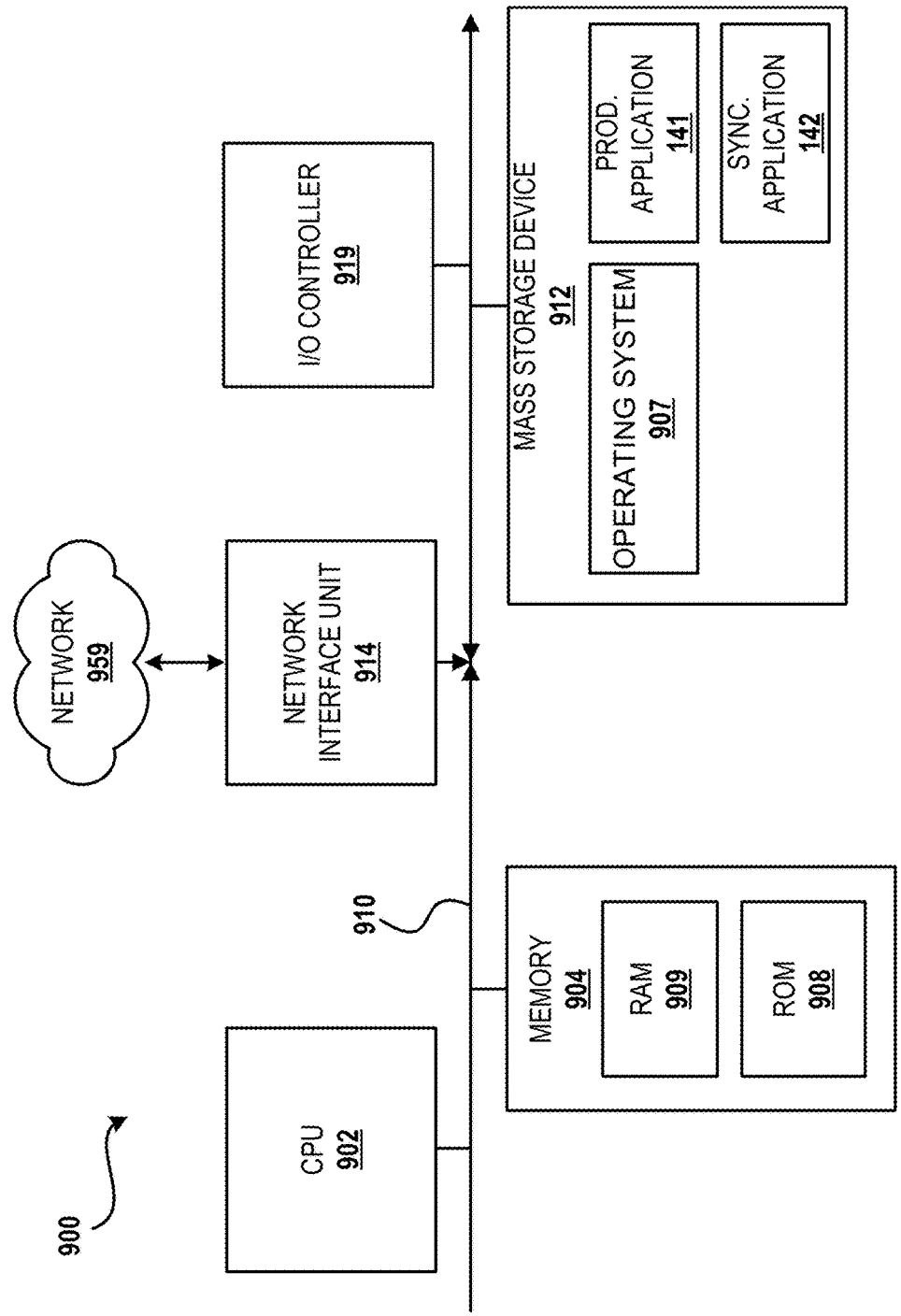
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a computer, such as the computing device 109 (FIG. 1), capable of executing the program components described herein. Thus, the computer architecture 900 illustrated in FIG. 9 illustrates an architecture for a server computer, a mobile phone, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random access memory 909 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 907, other data, and one or more application programs, such as a productivity application 141 and a synchronization application 142.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various configurations, the computer architecture 900 may operate in a networked environment using logical connections to remote computers through the network 959 and/or another network (not shown). The computer architecture 900 may connect to the network 959 through a network interface unit 914 connected to the bus 910. It should be appreciated that the network interface unit 914 also may be utilized to connect to other types of networks and remote computer systems. The computer architecture 900 also may include an input/output controller 919 for receiving and processing input from a number of other devices, including a keyboard, mouse, or electronic stylus (not shown in FIG. 9). Similarly, the input/output controller 919 may provide output to a display screen, a printer, or other type of output device (also not shown in FIG. 9).

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein.

According to various implementations, the distributed computing environment 1000 includes a computing environment 1002 operating on, in communication with, or as part of the network 1004. The network 1004 may be or may include the network 959, described above with reference to FIG. 9. The network 1004 also can include various access networks. One or more client devices 1006A-1006N (hereinafter referred to collectively and/or generically as "clients 1006" and also referred to herein as computing devices 106) can communicate with the computing environment 1002 via the network 1004 and/or other connections (not illustrated in FIG. 10). In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002. Two example computing architectures for the clients 1006 are illustrated and described herein with reference to FIGS. 9 and 10. It should be understood that the illustrated clients 1006 and computing architectures illustrated and described herein are illustrative, and should not be construed as being limiting in any way.

In the illustrated configuration, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. The application servers 1008 can host various services, virtual machines, portals, and/or other resources. In the illustrated configuration, the application servers 1008 host one or more virtual machines 1014 for hosting applications or other functionality. According to various implementations, the virtual machines 1014 host one or more applications and/or software modules for enabling in-application support for topological changes to files during remote synchronization. It should be understood that this configuration is illustrative, and should not be construed as being limiting in any way. The application servers 1008 also host or provide access to one or more portals, link pages, Web sites, and/or other information ("Web portals") 1016.

According to various implementations, the application servers 1008 also include one or more mailbox services 1018 and one or more messaging services 1020. The mailbox services 1018 can include electronic mail ("email") services. The mailbox services 1018 also can include various personal information management ("PIM") and presence services including, but not limited to, calendar services, contact management services, collaboration services, and/or other services. The messaging services 1020 can include, but are not limited to, instant messaging services, chat services, forum services, and/or other communication services.

The application servers 1008 also may include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1022 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1022 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1022 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1022 are not mentioned herein for the sake of brevity. As such, the above configurations are illustrative, and should not be construed as being limited in any way. According to various implementations, the social networking services 1022 may host one or more applications and/or software modules for providing the functionality described herein, such as enabling in-application support for topological changes to files during remote synchronization. For instance, any one of the application servers 1008 may communicate or facilitate the functionality and features described herein. For instance, a social networking application, mail client, messaging client or a browser running on a phone or any other client 1006 may communicate with a networking service 1022 and facilitate the functionality, even in part, described above with respect to FIG. 10. Any device or service depicted herein can be used as a resource for supplemental data, including email servers, storage servers, etc.

As shown in FIG. 10, the application servers 1008 also can host other services, applications, portals, and/or other resources ("other resources") 1024. The other resources 1024 can include, but are not limited to, document sharing, rendering or any other functionality. It thus can be appreciated that the computing environment 1002 can provide integration of the concepts and technologies disclosed herein with various mailbox, messaging, social networking, and/or other services or resources.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the application servers 1008 and/or other data. Although not illustrated in FIG. 10, the datastores 1026 also can host or store web page documents, word documents, presentation documents, data structures, algorithms for execution by a recommendation engine, and/or other data utilized by any application program or another module. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects. In one specific example, as summarized above, techniques described herein may be implemented, at least in part, by a web browser application, which works in conjunction with the application servers 1008 of FIG. 10.

Turning now to FIG. 11, an illustrative computing device architecture 1100 for a computing device that is capable of executing various software components described herein for enabling in-application support for topological changes to files during remote synchronization. The computing device architecture 1100 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1100 is applicable to any of the computing devices shown in FIGS. 1, 2, 9 and 10. Moreover, aspects of the computing device architecture 1100 may be applicable to traditional desktop computers, portable computers (e.g., phones, laptops, notebooks, ultra-portables, and netbooks), server computers, and other computer systems, such as described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 1100 illustrated in FIG. 11 includes a processor 1102, memory components 1104, network connectivity components 1106, sensor components 11011, input/output components 1110, and power components 1112. In the illustrated configuration, the processor 1102 is in communication with the memory components 1104, the network connectivity components 1106, the sensor components 11011, the input/output ("I/O") components 1110, and the power components 1112. Although no connections are shown between the individual components illustrated in FIG. 11, the components can interact to carry out device functions. In some configurations, the components are arranged so as to communicate via one or more busses (not shown).

The processor 1102 includes a central processing unit ("CPU") configured to process data, execute computer-executable instructions of one or more application programs, and communicate with other components of the computing device architecture 1100 in order to perform various functionality described herein. The processor 1102 may be utilized to execute aspects of the software components presented herein and, particularly, those that utilize, at least in part, a touch-enabled input.

In some configurations, the processor 1102 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 10110P, and higher resolution), video games, three-dimensional ("3D") modeling applications, and the like. In some configurations, the processor 1102 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1102 is, or is included in, a system-on-chip ("SoC") along with one or more of the other components described herein below. For example, the SoC may include the processor 1102, a GPU, one or more of the network connectivity components 1106, and one or more of the sensor components 11011. In some configurations, the processor 1102 is fabricated, in part, utilizing a package-on-package ("PoP") integrated circuit packaging technique. The processor 1102 may be a single core or multi-core processor.

The processor 1102 may be created in accordance with an ARM architecture, available for license from ARM HOLDINGS of Cambridge, United Kingdom. Alternatively, the processor 1102 may be created in accordance with an x116 architecture, such as is available from INTEL CORPORATION of Mountain View, Calif. and others. In some configurations, the processor 1102 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1104 include a random access memory ("RAM") 1114, a read-only memory ("ROM") 1116, an integrated storage memory ("integrated storage") 11111, and a removable storage memory ("removable storage") 1120. In some configurations, the RAM 1114 or a portion thereof, the ROM 1116 or a portion thereof, and/or some combination of the RAM 1114 and the ROM 1116 is integrated in the processor 1102. In some configurations, the ROM 1116 is configured to store a firmware, an operating system or a portion thereof (e.g., operating system kernel), and/or a bootloader to load an operating system kernel from the integrated storage 11111 and/or the removable storage 1120.

The integrated storage 11111 can include a solid-state memory, a hard disk, or a combination of solid-state memory and a hard disk. The integrated storage 11111 may be soldered or otherwise connected to a logic board upon which the processor 1102 and other components described herein also may be connected. As such, the integrated storage 11111 is integrated in the computing device. The integrated storage 11111 is configured to store an operating system or portions thereof, application programs, data, and other software components described herein.

The removable storage 1120 can include a solid-state memory, a hard disk, or a combination of solid-state memory and a hard disk. In some configurations, the removable storage 1120 is provided in lieu of the integrated storage 11111. In other configurations, the removable storage 1120 is provided as additional optional storage. In some configurations, the removable storage 1120 is logically combined with the integrated storage 11111 such that the total available storage is made available as a total combined storage capacity. In some configurations, the total combined capacity of the integrated storage 11111 and the removable storage 1120 is shown to a user instead of separate storage capacities for the integrated storage 11111 and the removable storage 1120.

The removable storage 1120 is configured to be inserted into a removable storage memory slot (not shown) or other mechanism by which the removable storage 1120 is inserted and secured to facilitate a connection over which the removable storage 1120 can communicate with other components of the computing device, such as the processor 1102. The removable storage 1120 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1104 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1106 include a wireless wide area network component ("WWAN component") 1122, a wireless local area network component ("WLAN component") 1124, and a wireless personal area network component ("WPAN component") 1126. The network connectivity components 1106 facilitate communications to and from the network 1156 or another network, which may be a WWAN, a WLAN, or a WPAN. Although only the network 1156 is illustrated, the network connectivity components 1106 may facilitate simultaneous communication with multiple networks, including the network 656 of FIG. 6. For example, the network connectivity components 1106 may facilitate simultaneous communications with multiple networks via one or more of a WWAN, a WLAN, or a WPAN.

The network 1156 may be or may include a WWAN, such as a mobile telecommunications network utilizing one or more mobile telecommunications technologies to provide voice and/or data services to a computing device utilizing the computing device architecture 1100 via the WWAN component 1122. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1156 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1156 may be configured to provide voice and/or data communications with any combination of the above technologies. The network 1156 may be configured to or adapted to provide voice and/or data communications in accordance with future generation technologies.

In some configurations, the WWAN component 1122 is configured to provide dual-multi-mode connectivity to the network 1156. For example, the WWAN component 1122 may be configured to provide connectivity to the network 1156, wherein the network 1156 provides service via GSM and UMTS technologies, or via some other combination of technologies. Alternatively, multiple WWAN components 1122 may be utilized to perform such functionality, and/or provide additional functionality to support other non-compatible technologies (i.e., incapable of being supported by a single WWAN component). The WWAN component 1122 may facilitate similar connectivity to multiple networks (e.g., a UMTS network and an LTE network).

The network 1156 may be a WLAN operating in accordance with one or more Institute of Electrical and Electronic Engineers ("IEEE") 1102.11 standards, such as IEEE 1102.11a, 1102.11b, 1102.11g, 1102.11n, and/or future 1102.11 standard (referred to herein collectively as WI-FI). Draft 1102.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1124 is configured to connect to the network 1156 via the WI-FI access points. Such connections may be secured via various encryption technologies including, but not limited, WI-FI Protected Access ("WPA"), WPA2, Wired Equivalent Privacy ("WEP"), and the like.

The network 1156 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1126 is configured to facilitate communications with other devices, such as peripherals, computers, or other computing devices via the WPAN.

The sensor components 11011 include a magnetometer 11211, an ambient light sensor 1130, a proximity sensor 1132, an accelerometer 1134, a gyroscope 1136, and a Global Positioning System sensor ("GPS sensor") 11311. It is contemplated that other sensors, such as, but not limited to, temperature sensors or shock detection sensors, also may be incorporated in the computing device architecture 1100.

The magnetometer 11211 is configured to measure the strength and direction of a magnetic field. In some configurations the magnetometer 11211 provides measurements to a compass application program stored within one of the memory components 1104 in order to provide a user with accurate directions in a frame of reference including the cardinal directions, north, south, east, and west. Similar measurements may be provided to a navigation application program that includes a compass component. Other uses of measurements obtained by the magnetometer 11211 are contemplated.

The ambient light sensor 1130 is configured to measure ambient light. In some configurations, the ambient light sensor 1130 provides measurements to an application program stored within one the memory components 1104 in order to automatically adjust the brightness of a display (described below) to compensate for low-light and high-light environments. Other uses of measurements obtained by the ambient light sensor 1130 are contemplated.

The proximity sensor 1132 is configured to detect the presence of an object or thing in proximity to the computing device without direct contact. In some configurations, the proximity sensor 1132 detects the presence of a user's body (e.g., the user's face) and provides this information to an application program stored within one of the memory components 1104 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1132 are contemplated.

The accelerometer 1134 is configured to measure proper acceleration. In some configurations, output from the accelerometer 1134 is used by an application program as an input mechanism to control some functionality of the application program. For example, the application program may be a video game in which a character, a portion thereof, or an object is moved or otherwise manipulated in response to input received via the accelerometer 1134. In some configurations, output from the accelerometer 1134 is provided to an application program for use in switching between landscape and portrait modes, calculating coordinate acceleration, or detecting a fall. Other uses of the accelerometer 1134 are contemplated.

The gyroscope 1136 is configured to measure and maintain orientation. In some configurations, output from the gyroscope 1136 is used by an application program as an input mechanism to control some functionality of the application program. For example, the gyroscope 1136 can be used for accurate recognition of movement within a 3D environment of a video game application or some other application. In some configurations, an application program utilizes output from the gyroscope 1136 and the accelerometer 1134 to enhance control of some functionality of the application program. Other uses of the gyroscope 1136 are contemplated.

The GPS sensor 11311 is configured to receive signals from GPS satellites for use in calculating a location. The location calculated by the GPS sensor 11311 may be used by any application program that requires or benefits from location information. For example, the location calculated by the GPS sensor 11311 may be used with a navigation application program to provide directions from the location to a destination or directions from the destination to the location. Moreover, the GPS sensor 11311 may be used to provide location information to an external location-based service, such as E911 service. The GPS sensor 11311 may obtain location information generated via WI-FI, WIMAX, and/or cellular triangulation techniques utilizing one or more of the network connectivity components 1106 to aid the GPS sensor 11311 in obtaining a location fix. The GPS sensor 11311 may also be used in Assisted GPS ("A-GPS") systems. The GPS sensor 11311 can also operate in conjunction with other components, such as the processor 1102, to generate positioning data for the computing device 1100.

The I/O components 1110 include a display 1140, a touchscreen 1142, a data I/O interface component ("data I/O") 1144, an audio I/O interface component ("audio I/O") 1146, a video I/O interface component ("video I/O") 11411, and a camera 1150. In some configurations, the display 1140 and the touchscreen 1142 are combined. In some configurations two or more of the data I/O component 1144, the audio I/O component 1146, and the video I/O component 11411 are combined. The I/O components 1110 may include discrete processors configured to support the various interface described below, or may include processing functionality built-in to the processor 1102.

The display 1140 is an output device configured to present information in a visual form. In particular, the display 1140 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1140 is a liquid crystal display ("LCD") utilizing any active or passive matrix technology and any backlighting technology (if used). In some configurations, the display 1140 is an organic light emitting diode ("OLED") display. Other display types are contemplated.

The touchscreen 1142, also referred to herein as a "touch-enabled screen," is an input device configured to detect the presence and location of a touch. The touchscreen 1142 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1142 is incorporated on top of the display 1140 as a transparent layer to enable a user to use one or more touches to interact with objects or other information presented on the display 1140. In other configurations, the touchscreen 1142 is a touch pad incorporated on a surface of the computing device that does not include the display 1140. For example, the computing device may have a touchscreen incorporated on top of the display 1140 and a touch pad on a surface opposite the display 1140.

In some configurations, the touchscreen 1142 is a single-touch touchscreen. In other configurations, the touchscreen 1142 is a multi-touch touchscreen. In some configurations, the touchscreen 1142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1142. As such, a developer may create gestures that are specific to a particular application program.

In some configurations, the touchscreen 1142 supports a tap gesture in which a user taps the touchscreen 1142 once on an item presented on the display 1140. The tap gesture may be used for various reasons including, but not limited to, opening or launching whatever the user taps. In some configurations, the touchscreen 1142 supports a double tap gesture in which a user taps the touchscreen 1142 twice on an item presented on the display 1140. The double tap gesture may be used for various reasons including, but not limited to, zooming in or zooming out in stages. In some configurations, the touchscreen 1142 supports a tap and hold gesture in which a user taps the touchscreen 1142 and maintains contact for at least a pre-defined time. The tap and hold gesture may be used for various reasons including, but not limited to, opening a context-specific menu.

In some configurations, the touchscreen 1142 supports a pan gesture in which a user places a finger on the touchscreen 1142 and maintains contact with the touchscreen 1142 while moving the finger on the touchscreen 1142. The pan gesture may be used for various reasons including, but not limited to, moving through screens, images, or menus at a controlled rate. Multiple finger pan gestures are also contemplated. In some configurations, the touchscreen 1142 supports a flick gesture in which a user swipes a finger in the direction the user wants the screen to move. The flick gesture may be used for various reasons including, but not limited to, scrolling horizontally or vertically through menus or pages. In some configurations, the touchscreen 1142 supports a pinch and stretch gesture in which a user makes a pinching motion with two fingers (e.g., thumb and forefinger) on the touchscreen 1142 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1142. As such, the above gestures should be understood as being illustrative and should not be construed as being limiting in any way.

The data I/O interface component 1144 is configured to facilitate input of data to the computing device and output of data from the computing device. In some configurations, the data I/O interface component 1144 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1146 is configured to provide audio input and/or output capabilities to the computing device. In some configurations, the audio I/O interface component 1146 includes a microphone configured to collect audio signals. In some configurations, the audio I/O interface component 1146 includes a headphone jack configured to provide connectivity for headphones or other external speakers. In some configurations, the audio I/O interface component 1146 includes a speaker for the output of audio signals. In some configurations, the audio I/O interface component 1146 includes an optical audio cable out.

The video I/O interface component 11411 is configured to provide video input and/or output capabilities to the computing device. In some configurations, the video I/O interface component 11411 includes a video connector configured to receive video as input from another device (e.g., a video media player such as a DVD or BLURAY player) or send video as output to another device (e.g., a monitor, a television, or some other external display). In some configurations, the video I/O interface component 11411 includes a High-Definition Multimedia Interface ("HDMI"), mini-HDMI, micro-HDMI, DisplayPort, or proprietary connector to input/output video content. In some configurations, the video I/O interface component 11411 or portions thereof is combined with the audio I/O interface component 1146 or portions thereof.

The camera 1150 can be configured to capture still images and/or video. The camera 1150 may utilize a charge coupled device ("CCD") or a complementary metal oxide semiconductor ("CMOS") image sensor to capture images. In some configurations, the camera 1150 includes a flash to aid in taking pictures in low-light environments. Settings for the camera 1150 may be implemented as hardware or software buttons.

Although not illustrated, one or more hardware buttons may also be included in the computing device architecture 1100. The hardware buttons may be used for controlling some operational aspect of the computing device. The hardware buttons may be dedicated buttons or multi-use buttons. The hardware buttons may be mechanical or sensor-based.

The illustrated power components 1112 include one or more batteries 1152, which can be connected to a battery gauge 1154. The batteries 1152 may be rechargeable or disposable. Rechargeable battery types include, but are not limited to, lithium polymer, lithium ion, nickel cadmium, and nickel metal hydride. Each of the batteries 1152 may be made of one or more cells.

The battery gauge 1154 can be configured to measure battery parameters such as current, voltage, and temperature. In some configurations, the battery gauge 1154 is configured to measure the effect of a battery's discharge rate, temperature, age and other factors to predict remaining life within a certain percentage of error. In some configurations, the battery gauge 1154 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1112 may also include a power connector, which may be combined with one or more of the aforementioned I/O components 1110. The power components 1112 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Example Clauses

The disclosure presented herein may be considered in view of the following clauses.

Example Clause A, a method for controlling access to data stored in a cloud-based storage service, the method comprising g:

storing, at the cloud-based storage service, data associated with a user account;

associating a portion of the data with a heightened authentication protocol;

receiving, at the cloud-based storage service, a request for an application to access data that is associated with the heightened authentication protocol;

authenticating the request based on the heightened authentication protocol;

in response to authenticating the request, granting permission to the application to access the data that is associated with the heightened authentication protocol, wherein the permission is time-limited;

determining that a time limit has been reached;

in response to determining that the time limit has been reached, determining that the application is editing the data that is associated with the heightened authentication protocol; and temporarily extending the permission for the application to access the data while the application is editing the data.

Example Clause B, the method of Example Clause A, wherein extending the permission comprises generating a child token associated with a secondary policy that is derived from an original token associated with the request.

Example Clause C, the method of Example Clause B, wherein the secondary policy of the child token is disjoint from the original token.

Example Clause D, the method of any one of Example Clauses A through C, wherein the secondary policy of the child token is derived from the original token.

Example Clause E, the method of any one of Example Clauses A through D, wherein a lifetime for the secondary policy of the child token is disjoint from the original token.

Example Clause F, the method of any one of Example Clauses A through D, wherein a lifetime for the secondary policy of the child token is tied to the original token.

Example Clause G, the method of any one of Example Clauses A through F, wherein the permission is limited to the data being edited.

Example Clause H, the method of any one of Example Clauses A through G, wherein temporarily extending the permission comprises granting a new session solely for editing the data.

Example Clause I, the method of any one of Example Clauses A through G, wherein the permission is temporarily extended without requiring a new authentication.

Example Clause J, the method of any one of Example Clauses A through I, wherein the permission is temporarily extended for a time increment.

Example Clause K, the method of any one of Example Clauses A through J, wherein temporarily extending the permission is limited to a maximum total extension time.

While Example Clauses A through K are described above with respect to a method, it is understood in the context of this disclosure that the subject matter of Example Clauses A through K can additionally or alternatively be implemented as a system, computing device, or via computer readable storage media.

Example Clause L, a system for controlling access to data stored in a cloud-based storage service, the system comprising:

one or more data processing units;

a computer-readable medium having encoded thereon computer-executable instructions to cause the one or more data processing units to perform operations comprising:

storing data associated with a user account;

associating a portion of the data with a heightened authentication protocol;

receiving a request to access data that is associated with the heightened authentication protocol;

authenticating the request based on the heightened authentication protocol;

in response to authenticating the request, opening a session to access the data that is associated with the heightened authentication protocol, wherein the session is time-limited;

determining that a time limit associated with the session has been reached;

in response to determining that the time limit has been reached, determining that an application is editing a portion of the data that is associated with the heightened authentication protocol; and opening a new session to allow the application to continue editing the data.

Example Clause M, the system of Example Clause L, wherein the new session is scoped to the portion of the data being edited.

Example Clause N, the system of Example Clause L or Example Clause M, wherein portions of the data that are not being edited are not accessible by the application.

Example Clause O, the system of Example Clauses L through Example Clause N, wherein opening the new session comprises generating a child token associated with a secondary policy that is derived from an original token associated with the request.

Example Clause P, the system of Example Clauses L through Example Clause O, wherein the secondary policy is disjoint from the original token.

Example Clause Q, the system of Example Clauses L through Example Clause P, wherein the secondary policy is derived from the original token.

Example Clause R, the system of Example Clauses L through Example Clause Q, wherein a lifetime for the secondary policy is disjoint from the original token.

Example Clause S, the system of Example Clauses L through Example Clause R, wherein a lifetime for the secondary policy is tied to the original token.

While Example Clauses L through S are described above with respect to a computing device, it is understood in the context of this disclosure that the subject matter of Example Clauses L through S can additionally or alternatively be implemented by a method, computing device, or via computer readable storage media.

Example Clause T, a computing device comprising:

one or more data processing units; and a computer-readable medium having encoded thereon computer-executable instructions to cause the one or more data processing units to perform operations comprising:

storing data associated with a user account;

associating a portion of the data with a heightened authentication protocol;

receiving a request to access data that is associated with the heightened authentication protocol;

authenticating the request based on the heightened authentication protocol;

in response to authenticating the request, opening a session to access the data that is associated with the heightened authentication protocol, wherein the session is time-limited;

determining that a time limit associated with the session has been reached;

in response to determining that the time limit has been reached, determining that an application is editing a document that is associated with the heightened authentication protocol; and opening a new session to allow the application to continue editing the document.

While Example Clause T is described above with respect to a computing device, it is understood in the context of this disclosure that the subject matter of Example Clauses P through T can additionally or alternatively be implemented as a method, co computer-readable medium, or system.

Example Clause U, a method for controlling access to data stored in a cloud-based storage service, the method comprising:

receiving, at the cloud-based storage service, a first request to access data stored at the cloud-based storage service, the data associated with a user account;

authenticating the first request based on a username and password associated with the user account;

receiving, at the cloud-based storage service, a second request for a file that is stored in an area associated with a heightened authentication protocol;

performing the heightened authentication protocol to authenticate the second request;

in response to authenticating the second request, granting, to a temporary strong authentication state, a permission to access the file that is stored in the area associated with the heightened authentication protocol; and in response to a failure to authenticate the second request, denying access to the file that is stored in the area associated with the heightened authentication protocol, while allowing access to files stored in other areas associated with the user account.

Example Clause V, the method of Example Clause U, wherein the permission is based on using access control lists (ACLs) to grant access to the authentication state.

Example Clause W, the method of Example Clause U or Example Clause V, wherein the ACLs are automatically expired after a predetermined time.

Example Clause X, a method for controlling access to data stored in a cloud-based storage service, the method comprising:

receiving, at the cloud-based storage service, a first request to access data stored at the cloud-based storage service, the data associated with a user account;

authenticating the first request based on a username and password associated with the user account;

receiving, at the cloud-based storage service, a second request for a file that is stored in an area associated with a heightened authentication protocol;

performing the heightened authentication protocol to authenticate the second request;

in response to authenticating the second request, granting, to a temporary strong authentication state, a permission to access the file that is stored in the area associated with the heightened authentication protocol; and in response to a failure to authenticate the second request, denying access to the file that is stored in the area associated with the heightened authentication protocol, while allowing access to files stored in other areas associated with the user account.

While Example Clauses U through X are described above with respect to a method, it is understood in the context of this disclosure that the subject matter of Example Clauses U through X can additionally or alternatively be implemented as a system, computing device, or via computer readable storage media.

Example Clause Y, a method for controlling access to data stored in a cloud-based storage service, the method comprising:

storing, at the cloud-based storage service, data associated with a user account;

associating a portion of the data with a heightened authentication protocol;

receiving, at the cloud-based storage service, a first request for an application to access data that is associated with the heightened authentication protocol;

authenticating the first request based on the heightened authentication protocol;

in response to authenticating the first request, granting permission to the application to access the data that is associated with the heightened authentication protocol, wherein the permission is time-limited;

determining that the application is editing the data that is associated with the heightened authentication protocol; and temporarily extending the permission for the application to access the data while the application is editing the data.

Example Clause Z, the method of Example Clause Y, wherein extending the permission comprises generating a child token associated with a secondary policy that is derived from an original token associated with the first request.

Example Clause AA, the method of Example Clause Y or Example Clause Z, wherein the child token policy is disjoint from the original token.

Example Clause BB, the method of any one of Example Clauses Y through AA, wherein the child token policy is derived from the original token.

Example Clause CC, the method of any one of Example Clauses Y through BB, wherein a lifetime for the child token policy is disjoint from the original token.

Example Clause DD, the method of any one of Example Clauses Y through CC, wherein a lifetime for the child token policy is tied to the original token.

While Example Clauses Y through DD are described above with respect to a method, it is understood in the context of this disclosure that the subject matter of Example Clauses Y through DD can additionally or alternatively be implemented as a system, computing device, or via computer readable storage media.

Example Clause EE, a method for controlling access to data stored in a cloud-based storage service, the method comprising:

storing, at the cloud-based storage service, data associated with a user account;

receiving, at the cloud-based storage service, a first request to cause a portion of the data to be associated with a heightened authentication protocol;

in response to the first request, causing the portion of the data to require the heightened authentication protocol for access;

receiving, at the cloud-based storage service, a second request for a file that is stored in the area that is associated with the heightened authentication protocol;

authenticating the second request based on the heightened authentication protocol;

in response to authenticating the second request, granting permission to access the file that is stored in the area associated with the heightened authentication protocol; and in response to a failure to authenticate the second request, denying access to the file that is stored in the area associated with the heightened authentication protocol, while allowing access to files stored in other areas associated with the user account based on an authentication based on a single factor authentication mechanism associated with the user account.

While Example Clause EE is described above with respect to a method, it is understood in the context of this disclosure that the subject matter of Example Clause EE can additionally or alternatively be implemented as a system, computing device, or via computer readable storage media.

Example Clause FF, a method for controlling access to data stored in a cloud-based storage service, the method comprising:

storing, at the cloud-based storage service, data associated with a user account;

associating a portion of the data with a heightened authentication protocol;

receiving, at the cloud-based storage service, a request for an application to access data that is associated with the heightened authentication protocol, the request including an indication that the application is configured to interact with data with the heightened authentication protocol;

based on the indication, authenticating the request based on the heightened authentication protocol;

in response to authenticating the first request, granting permission to the application to access the data that is associated with the heightened authentication protocol; and in response receiving requests that do not include the indication that the application is configured to interact with data with the heightened authentication protocol, hiding data pertaining to the portion of the data with the heightened authentication protocol.

While Example Clause FF is described above with respect to a method, it is understood in the context of this disclosure that the subject matter of Example Clause FF can additionally or alternatively be implemented as a system, computing device, or via computer readable storage media.

The invention claimed is:

1. A method for controlling access to data stored in a cloud-based storage service, the method comprising:
   storing, at the cloud-based storage service, data associated with a user account;
   associating a portion of the data with a heightened authentication protocol;
   receiving, at the cloud-based storage service, a user request for an application to access data that is associated with the heightened authentication protocol;
   authenticating the user request based on the heightened authentication protocol;
   in response to authenticating the request, granting permission to the application to access the data that is associated with the heightened authentication protocol, wherein the permission is time-limited;
   determining that a time limit has been reached;
   in response to determining that the time limit has been reached, determining that the application is editing the data that is associated with the heightened authentication protocol; and
   in response to determining that the application is editing the data, automatically and without user intervention, temporarily extending the time limit for the application to access the data while the application is editing the data.

2. The method of claim 1, wherein extending the permission comprises generating a child token associated with a secondary policy that is derived from an original token associated with the request.

3. The method of claim 2, wherein the secondary policy of the child token is disjoint from the original token.

4. The method of claim 2, wherein the secondary policy of the child token is derived from the original token.

5. The method of claim 2, wherein a lifetime for the secondary policy of the child token is disjoint from the original token.

6. The method of claim 2, wherein a lifetime for the secondary policy of the child token is tied to the original token.

7. The method of claim 1, wherein the permission is limited to the data being edited.

8. The method of claim 1, wherein temporarily extending the permission comprises granting a new session solely for editing the data.

9. The method of claim 1, wherein the permission is temporarily extended without requiring a new authentication.

10. The method of claim 1, wherein the permission is temporarily extended for a time increment.

11. The method of claim 1, wherein temporarily extending the permission is limited to a maximum total extension time.

12. A system for controlling access to data stored in a cloud-based storage service, the system comprising:
    one or more hardware processors; and
    a computer-readable medium having encoded thereon computer-executable instructions that, when executed by one or more hardware processors, cause the system data to perform operations comprising:
    storing data associated with a user account;
    associating a portion of the data with a heightened authentication protocol;
    receiving a user request to access data that is associated with the heightened authentication protocol;
    authenticating the user request based on the heightened authentication protocol;
    in response to authenticating the request, opening a session to access the data that is associated with the heightened authentication protocol, wherein the session is time-limited;
    determining that a time limit associated with the session has been reached;
    in response to determining that the time limit has been reached, determining that an application is editing a portion of the data that is associated with the heightened authentication protocol; and
    in response to determining that the application is editing the portion of the data, automatically and without user intervention, opening a new session to allow the application to continue editing the data.

13. The system of claim 12, wherein the new session is scoped to the portion of the data being edited.

14. The system of claim 12, wherein portions of the data that are not being edited are not accessible by the application.

15. The system of claim 12, wherein opening the new session comprises generating a child token associated with a secondary policy that is derived from an original token associated with the request.

16. The system of claim 15, wherein the secondary policy is disjoint from the original token.

17. The system of claim 15, wherein the secondary policy is derived from the original token.

18. The system of claim 15, wherein a lifetime for the secondary policy is disjoint from the original token.

19. The system of claim 15, wherein a lifetime for the secondary policy is tied to the original token.

20. A computing device comprising:
    one or more hardware processors; and
    a computer-readable medium having encoded thereon computer-executable instructions that, when executed by the hardware processors, cause the computing device to perform operations comprising:
    storing data associated with a user account;
    associating a portion of the data with a heightened authentication protocol;

receiving a user request to access data that is associated with the heightened authentication protocol;

authenticating the user request based on the heightened authentication protocol;

in response to authenticating the request, opening a session to access the data that is associated with the heightened authentication protocol, wherein the session is time-limited;

determining that a time limit associated with the session has been reached;

in response to determining that the time limit has been reached, determining that an application is editing a document that is associated with the heightened authentication protocol; and in response to determining that the application is editing the data, automatically and without user intervention, opening a new session to allow the application to continue editing the document.

* * * * *